United States Patent
Morishima

(10) Patent No.: US 8,658,261 B2
(45) Date of Patent: Feb. 25, 2014

(54) COMPOSITION, FILM, POLARIZING PLATE, AND LIQUID CRYSTAL DISPLAY DEVICE

(75) Inventor: Shinichi Morishima, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1433 days.

(21) Appl. No.: 12/256,539

(22) Filed: Oct. 23, 2008

(65) Prior Publication Data

US 2009/0109378 A1    Apr. 30, 2009

(30) Foreign Application Priority Data

Oct. 25, 2007    (JP) ................... 2007-277369

(51) Int. Cl.
- *C09K 19/00* (2006.01)
- *G02F 1/1335* (2006.01)
- *C08G 63/08* (2006.01)
- *C08B 37/00* (2006.01)

(52) U.S. Cl.
USPC .......... 428/1.33; 349/96; 528/354; 525/54.21

(58) Field of Classification Search
None
See application file for complete search history.

(56) References Cited

U.S. PATENT DOCUMENTS

2006/0060821 A1 *  3/2006  Fujisawa et al. ......... 252/299.01

FOREIGN PATENT DOCUMENTS

| JP | 49-11155 | 3/1974 |
|---|---|---|
| JP | 09-095520 A | 4/1997 |
| JP | 2005-242293 A | 9/2005 |
| JP | 2007-017958 A | 1/2007 |
| JP | 2007-031709 A | 2/2007 |
| JP | 2007-249180 A | 9/2007 |
| JP | 2007-279688 A | 10/2007 |
| JP | 2007-321108 A | 12/2007 |
| WO | WO 2006132404 A1 * | 12/2006 |
| WO | WO 2006137599 A1 * | 12/2006 |
| WO | WO 2008072794 A1 * | 6/2008 |

OTHER PUBLICATIONS

Kang, C.-S. et al. "Rigid Rodlike Main chain Polymers with confomationally Restricted Nonlinear Optical Chromophores: Synthesis and Properties." Macromolecules, vol. 27, No. 21, 1994: 6156-6162.*

Yamamoto et al., Preparation and properites of pi-conjugated poly(benzimidazole-4,7-diyl)s, 1998, Macromolecular Chemistry and Physics, 199, 1807-1813.*

Japanese Official Action dated Mar. 13, 2012, issued in corresponding Japanese Patent Application No. 2007-277369 (and partial translation of Japanese Office Action set forth in Second IDS).

* cited by examiner

*Primary Examiner* — Ellen S Raudenbush
*Assistant Examiner* — Anthony J Frost
(74) *Attorney, Agent, or Firm* — Buchanan Ingersoll & Rooney PC

(57) ABSTRACT

Disclosed is a composition comprising a polymer comprising a repeating unit represented by formula (I). Each of $A^1$ and $A^2$ represents a group selected from the group consisting of —O—, —$NR^a$— ($R^a$ represents a hydrogen atom or a substituent), —S—, and —CO—; each of $R^1$, $R^2$ and $R^3$ represents a substituent; n is an integer from 0 to 2; X represents an alkenylene group, alkynylene group, arylene group, or heterocyclic group; each of $L^1$ and $L^2$ independently represents a linking group.

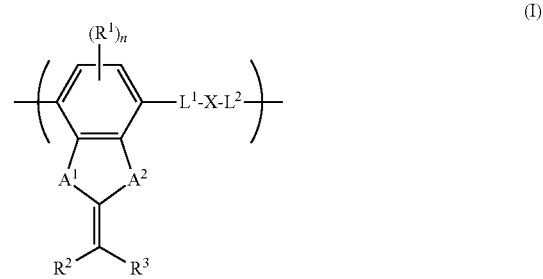

20 Claims, No Drawings

COMPOSITION, FILM, POLARIZING PLATE, AND LIQUID CRYSTAL DISPLAY DEVICE

CROSS-REFERENCE TO RELATED APPLICATIONS

This application claims benefit of priority under 35 U.S.C. 119 to Japanese Patent Application No. 2007-277369 filed on Oct. 25, 2007; and the entire contents of the application are incorporated herein by reference.

BACKGROUND OF THE INVENTION

1. Field of the Invention

The present invention relates to a composition useful for producing a retardation film showing reversed wavelength dispersion of retardation. The present invention relates also to a film formed of the composition, and a polarizing plate and a liquid crystal display device comprising the film.

2. Related Art

Liquid crystal display devices have been used for more and more various purposes, as image display devices characterized by small power consumption and space saving. Previously, liquid crystal display devices have conventionally been seemed to have disadvantages due to their notable viewing-angle dependence of image. However, wide-viewing-angle liquid crystal modes such as a VA mode have been provided recently, and demand for liquid crystal display devices employing such a mode have increased more and more even in the market for requiring high-definition images such as the market for televisions. In accordance with the situation, the liquid crystal display devices are required to further improve their color quality, contrast, and also optical compensation performances of optical compensation components used for improving the viewing-angle dependence. For the purpose of improvement, there has been proposed an optical compensation component satisfying optical characteristics such that retardation in plane is smaller on the shorter wavelength side (reversed wavelength dispersion), and that retardation along thickness direction is larger on the shorter wavelength side (regular wavelength dispersion) (JPA No. 2005-242293).

The proposal relates to a method of producing a wide-band λ/4 plate (a polarizing plate converting linear polarization into circular polarization). This technique might be useful in that a single retardation film, which may function as a wide-band λ/4 plate alone, is obtainable, but retardation of the film falls within a narrow range, so that it has been necessary to stack a plurality of films in order to provide various optical characteristics by using the technique. Solving such a problem is required for providing not only a λ/4 plate but also other optical films.

Another problem of the high-viewing-angle liquid crystal mode such as VA mode resides in color shift, emerging in the black sate when the viewing direction is changed from the normal-line direction to the oblique direction inclined by a certain angle (viewing-angle direction).

SUMMARY OF THE INVENTION

An object of the present invention is to provide a film having retardation in plane and retardation along thickness direction which are independently controlled, and a composition useful for producing the film.

Another object of the present invention is to provide a polarizing plate showing reversed wavelength dispersion characteristics, and a liquid crystal display device employing the polarizing plate, and is thereby causative of only a small color shift, improved in viewing-angle dependence of contrast, and excellent in definition of displayed image.

The means for achieving the objects are as follows.

[1] A composition comprising a polymer comprising a repeating unit represented by formula (I) below:

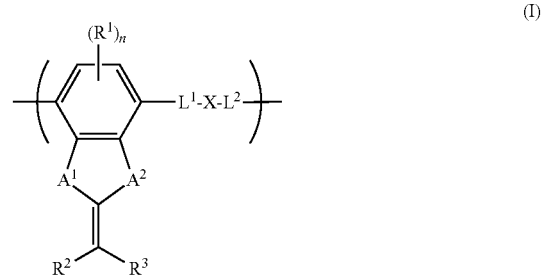

where, each of $A^1$ and $A^2$ independently represents a group selected from the group consisting of —O—, —$NR^a$— ($R^a$ represents a hydrogen atom or a substituent), —S—, and —CO—; each of $R^1$, $R^2$ and $R^3$ independently represents a substituent; n is an integer from 0 to 2; X represents an alkenylene group, alkynylene group, arylene group, or heterocyclic group; each of $L^1$ and $L^2$ independently represents one selected from Linking Group II shown below:

Linking Group II

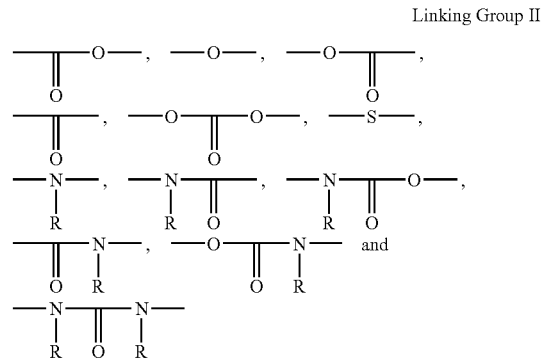

where, R represents a hydrogen atom, alkyl group having 1 to 30 carbon atoms, or cycloalkyl group having 3 to 30 carbon atoms.

[2] The composition as set forth in [1], further comprising a cellulose compound.

[3] The composition as set forth in [2], wherein said cellulose compound is cellulose acylate.

[4] A film comprising a polymer comprising a repeating unit represented by formula (I) as set forth in [1].

[5] The film as set forth in [4], comprising a cellulose compound as a major ingredient.

[6] The film as set forth in [4] or [5], having a positive birefringence Δn(550 nm), and satisfying relational expressions (1) and (2) below:

$$0.5 < \Delta n(450 \text{ nm})/\Delta n(550 \text{ nm}) < 1.0 \qquad (1)$$

$$1.05 < \Delta n(630 \text{ nm})/\Delta n(550 \text{ nm}) < 1.5. \qquad (2)$$

[7] A polarizing plate comprising a polarizer, and a film as set forth in any one of [4] to [6].

[8] A liquid crystal display device comprising a film as set forth in any one of claims [4] to [6] and/or a polarizing plate as set forth in [7].

PREFERRED EMBODIMENT OF THE INVENTION

Paragraphs below will detail the present invention. The explanation below may be made based on representative embodiments of the present invention, without limiting the present invention. Any numerical range expressed using "to" in this patent specification means a range including the preceding and succeeding numerical values as the lower limit and the upper limit, respectively.

[Polymer Composition]

The present invention relates to a composition comprising at least one polymer represented by formula (I) below.

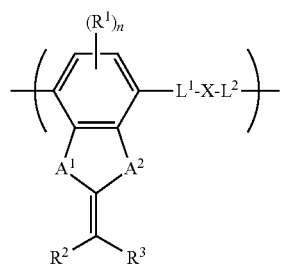

In the formula, each of $A^1$ and $A^2$ independently represents a group selected from the group consisting of —O—, —NR$^a$— (R$^a$ represents a hydrogen atom or a substituent), —S—, and —CO—; each of $R^1$, $R^2$ and $R^3$ independently represents a substituent. The letter "n" represents an integer from 0 to 2. X represents an alkenylene group, alkynylene group, arylene group, or heterocyclic group. Each of $L^1$ and $L^2$ independently represents one selected from Linking Group II shown below.

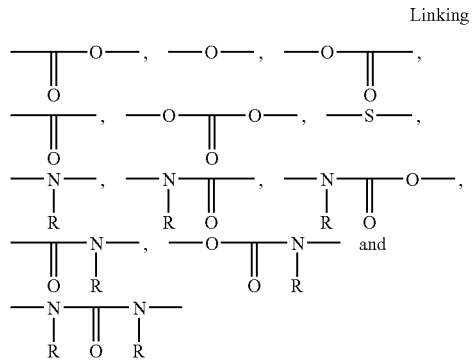

Linking Group II where R represents a hydrogen atom, alkyl group having 1 to 30 carbon atoms, or cycloalkyl group having 3 to 30 carbon atoms.

In the formula, each of $A^1$ and $A^2$ independently represents a group selected from the set consisting of —O—, —NR— (R is an hydrogen atom or substituent), —S— and —CO—. More preferably, it represents —O—, —NR— (R represents a substituent, and is exemplified by $R^1$ described later) or —S—.

In the divalent linking groups of Linking Group II represented by $L^1$ and $L^2$, R represents a hydrogen atom, alkyl group having 1 to 30 carbon atoms (for example, methyl, ethyl, n-propyl, isopropyl, tert-butyl, n-octyl, 2-ethylhexyl), or cycloalkyl group having 3 to 30 carbon atoms (for example, cyclohexyl, cyclopentyl).

More preferably, R represents —O—, —COO—, —OCO—, or —O(C=O)O—.

In the formula, each of $R^1$ to $R^3$ respectively represents a substituent, wherein a plurality of ($R^1$)s, if there were, may be same with or different from each other, and still may form a ring.

Examples of the substituent include halogen atoms such as fluorine atom, chlorine atom, bromine atom and iodine atom; alkyls (preferably $C_{1-30}$ alkyls) such as methyl, ethyl, n-propyl, isopropyl, tert-butyl, n-octyl and 2-ethylhexyl; cycloalkyls (preferably substituted or non-substituted $C_{3-30}$ cycloalkyls) such as cyclohexyl, cyclopentyl and 4-n-dodecyl cyclohexyl; bicycloalkyls (preferably substituted or non-substituted $C_{5-30}$ bicycloalkyls, or, in other words, monovalent residues of $C_{5-30}$ bicycloalkanes removed a hydrogen atom therefrom) such as bicyclo[1,2,2]heptane-2-yl and bicyclo[2,2,2]octane-3-yl; alkenyls (preferably substituted or non-substituted $C_{2-30}$ alkenyls) such as vinyl and allyl; cycloalkenyls (preferably substituted or non-substituted $C_{3-30}$ cycloalkenyls, or, in other words, monovalent residues of $C_{3-30}$ cycloalkens removed a hydrogen atom therefrom) such as 2-cyclopenetne-1-yl and 2-cyclohexene-1-yl; bicycloalkenyls (preferably substituted or non-substituted $C_{5-30}$ bicycloalkenyls, or, in other words, monovalent residues of $C_{5-30}$ bicycloalkenes removed a hydrogen atom therefrom) such as bicyclo[2,2,1]hepto-2-en-1-yl and bicyclo[2,2,2]octo-2-en-4-yl; alkynyls (preferably substituted or non-substituted $C_{2-20}$ alkynyls) such as ethynyl and propargyl; aryls (preferably substituted or non-substituted $C_{6-30}$ aryls) such as phenyl, p-tolyl and naphthyl; heterocyclic groups (preferably residues of 5- or 6-membered, substituted or non-substituted, aromatic or non-aromatic heterocyclic compounds removed a hydrogen atom therefrom, and more preferably 5- or 6-membered $C_{3-30}$ aromatic heterocyclic groups) such as 2-fruryl, 2-thienyl, 2-pyrimidinyl and 2-benzothiazolyl; cyano; hydroxyl; nitro; carboxyl; alkoxys (preferably substituted or non-substituted $C_{1-30}$ alkoxys) such as methoxy, ethoxy, isopropoxy, tert-butoxy, n-octyloxy and 2-methoxy ethoxy; aryloxys (preferably substituted or non-substituted $C_{6-30}$ aryloxys) such as phenoxy, 2-methylphenoxy, 4-tert-butylphenoxy, 3-nitrophenoxy and 2-tetradecanoyl aminophenoxy; silyloxy groups (preferably $C_{3-20}$ silyloxy groups) such as trimethyl silyloxy and tert-butyldimethyl silyloxy; heterocyclic-oxy groups (preferably substituted or non-substituted $C_{2-30}$ heterocyclic-oxy groups) such as 1-phenyl tetrazole-5-oxy and 2-tetrahydro pyranyloxy; acyloxys (preferably formyloxy, substituted or non-substituted $C_{2-30}$ alkylcarbonyloxys and $C_{6-30}$ substituted or non-substituted arylcarbonyloxys) such as formyloxy, acetyloxy, pivaloyloxy, stearoyl oxy, benzoyloxy, and p-methoxyphenyl carbonyloxy; carbamoyloxys (preferably substituted or non-substituted $C_{1-30}$ carbamoyloxys) such as N,N-dimethyl carbamoyloxy, N,N-diethyl carbamoyloxy, morpholino carbonyloxy, N,N-di-n-octylamino carbonyloxy and N-n-octylcarbamoyloxy; alkoxycarbonyloxys (preferably substituted or non-substituted $C_{2-30}$ alkoxycarbonyloxys) such as methoxycarbonyloxy, ethoxycarbonyloxy, tert-butoxycarbonyloxy and n-octylcarbonyloxy; aryloxycarbonyloxys (preferably substituted or non-substituted $C_{7-30}$ aryloxycarbonyloxys) such as phenoxycarbonyloxy, p-methoxyphenoxycarbonyloxy and p-n-hexadecyloxy phenoxycarbonyloxy; aminos (preferably non-substituted amino, substituted or non-substituted $C_{1-30}$ alkylaminos and substituted or non-substituted $C_{6-30}$ anylinos) such as non-substituted amino, methylamino, dimethylamino, anilino, N-methyl-anilino and diphenylamino; acylaminos (preferably formylamino, substituted or non-substituted $C_{1-30}$ alkylcarbonylaminos and substituted or non-substituted $C_{6-30}$ arylcarbonylaminos) such as formylamino, acetylamino, pivaloylamino, lauroylamino and benzoylamino; aminocarbonylaminos (preferably substituted or non-substituted $C_{1-30}$ aminocarbonylaminos) such as carbamoylamino, N,N-dimethylamino carbamoylamino, N,N-diethylamino carbamoylamino and morpholino carbamoylamino; alkoxycarbonylaminos (preferably substituted or non-substituted $C_{2-30}$ alkoxycarbonylaminos) such as methoxycarbonylamino, ethoxycarbonylamino, tert-butoxycarbonylamino, n-octadecyloxy carbonylamino and N-methyl-methoxycarbonylamino; aryloxycarbonylaminos (preferably substituted or non-substituted $C_{7-30}$ aryloxycarbonylaminos) such as phenoxycarbonylamino, p-chlorophenoxycarbonylamino and m-n-octyloxy phenoxycarbonyl amino; sulfamoylaminos (preferably substituted or non-substituted $C_{0-30}$ sulfamoylaminos) such as sulfamoylamino, N,N-dimethylamino sulfonylamino and N-n-octylamino sulfonylamino; alkyl- and aryl-sulfonylaminos (preferably substituted or non-substituted $C_{1-30}$ alkylsulfonylaminos and substituted or non-substituted $C_{6-30}$ arylsulfonylaminos) such as methylsulfonylamino, butylsulfonylamino, phenylsulfonylamino, 2,3,5-trichlorophenyl sulfonylamino and p-methylphenyl sulfonylamino; mercapto; alkylthios (preferably substituted or non-substituted $C_{1-30}$ alkylthios) such as methylthio, ethylthio and n-hexadecylthio; arylthios (preferably substituted or non-substituted $C_{6-30}$ arylthios) such as phenylthio, p-chlorophenylthio and m-methoxyphenylthio; heterocyclicthios (preferably substituted or non-substituted $C_{2-30}$ heterocyclicthios) such as 2-benzothiazolylthio and 1-phenyltetrazol-5-ylthio; sulfamoyls (preferably substituted or non-substituted $C_{0-30}$ sulfamoyls) such as N-ethylsulfamoyl, N-(3-dodecyloxypropyl)sulfamoyl, N,N-dimethylsulfamoyl, N-acetylsulfamoyl, N-benzoylsulfamoyl and N—(N'-phenylcarbamoyl)sulfamoyl; sulfo; alkyl- and aryl-sulfinyls (preferably substituted or non-substituted $C_{1-30}$ alkylsulfinyls and substituted or non-substituted $C_{6-30}$ arylsulfinyls) such as methylsulfinyl, ethylsulfinyl, phenylsulfinyl and p-methylphenylsulfinyl; alkyl- and aryl-sulfonyls (preferably substituted or non-substituted $C_{1-30}$ alkylsulfonyls and substituted or non-substituted $C_{6-30}$ arylsulfonyls) such as methylsulfonyl, ethylsulfonyl, phenylsulfonyl and p-methylphenylsulfonyl; acyls (preferably formyl, substituted or non-substituted $C_{2-30}$ alkylcarbonyls and substituted or non-substituted $C_{7-30}$ arylcarbonyls) such as formyl, acetyl and pivaloyl benzoyl; aryloxycarbonyls (preferably substituted or non-substituted $C_{7-30}$ aryloxycarbonyls) such as phenoxycarbonyl, o-chlorophenoxycarbonyl, m-nitrophenoxy carbonyl and p-tert-butylphenoxy carbonyl; alkoxycarbonyls (preferably substituted or non-substituted $C_{2-30}$ alkoxycarbonyls) such as methoxycarbonyl, ethoxycarbonyl, tert-butoxycarbonyl and n-octadecylcarbonyl; carbamoyls (preferably substituted or non-substituted $C_{1-30}$ carbamoyls) such as non-substituted carbamoyl, N-methylcarbamoyl, N,N-dimethylcarbamoyl, N,N-di-n-octylcarbamoyl and N-(methylsulfonyl)carbamoyl; aryl- and heterocyclic azo groups (preferably substituted or non-substituted $C_{6-30}$ arylazo groups and substituted or non-substituted $C_{3-30}$ heterocyclic azo groups) such as phenylazo, p-chlorophenylazo and 5-ethylthio-1,3,4-thiaziazol-2-yl azo; imido groups such as N-succinimido and N-phthalimido; phosphinos (preferably substituted or non-substituted $C_{2-30}$ phosphinos) such as dimethyl phosphino, diphenyl phosphino and methylphenoxy phosphino; phosphinyls (preferably substituted or non-substituted $C_{2-30}$ phosphinyls) such as non-substituted phosphinyl, dioctyl phosphinyl and diethoxy phosphinyl; phosphinyloxys (preferably substituted or non-substituted $C_{2-30}$ phosphinyloxys) such as diphenoxy phosphinyloxy and dioctyloxy phosphinyloxy; phosphinylaminos (preferably substituted or non-substituted $C_{2-30}$ phosphinylaminos) such as dimethoxy phosphinylamino and dimethyl phosphinylamino; and silyl groups (preferably substituted or non-substituted $C_{3-30}$ silyl groups) such as trimethyl silyl, tert-butyl silyl and phenyldimethyl silyl.

The exemplified substituents having at least one hydrogen atom the exemplified substituents may have at least one substituent in place of hydrogen atom. Examples of such a substituent include alkylcarbonylaminosulfonyl, arylcarbonylaminosulfonyl, alkylsulfonylaminocarbonyl and arylsulfonylaminocarbonyl. Specific examples include methylsulfonylaminocarbonyl, p-methylphenylaminocarbonyl, acetylaminosulfonyl and benzoyl aminosulfonyl.

$R^1$ is preferably a chlorine atom, alkyl group, alkenyl group, aryl group, heterocyclic group, hydroxy, carboxyl, alkoxy group, aryloxy group, acyloxy group or amino group, and more preferably a chlorine atom, alkyl group, aryl group, hydroxy or amino group.

Each of $R^2$ and $R^3$ is preferably an electron attractive substituent having a Hammett's substituent constant $\sigma_p$ of larger than 0, and more preferably an electron attractive substituent having a $\sigma_p$ value of 0 to 1.5. Examples of such a substituent include trifluoromethyl, cyano, carbonyl, and nitro. $R^2$ and $R^3$ may bind to each other to form a ring.

Hammett's substituent constants $\sigma_p$ and $\sigma_m$ are described in detail in publications such as "Hammett Soku, Kozo to Hannosei (Hammett's Rule, Structure and Reactivity)", written by Naoki Inamoto (published by Maruzen), "Shin Jikken Kagaku Koza 14 Yuki Kagobutu no Gosei to Hannno V (New Course of Experimental Chemistry 14, Synthesis and Reaction of Organic Compounds V)", edited by The Chemical Society of Japan, p. 2605 (published by Maruzen), "Riron Yuki Kagaku Kaisetsu (Review of Theoretical Organic Chemistry)", written by Tadao Nakaya, p. 217 (published by Tokyo Kagaku Dozin Co., Ltd.), Chemical Review, Vol. 91, p. 165-195 (1991) and so forth.

In formula (I), n represents an integer from 0 to 2, and preferably 0 or 1.

In formula (I), X represents an alkenylene group (preferably having 2 to 20 carbon atoms, more preferably having 2 to 12 carbon atoms, particularly preferably having 2 to 8 carbon atoms, and examples of the alkenylene group include vinylene, allylene, 2-butenylene and 3-pentenylene); an alkynylene group (preferably having 2 to 20 carbon atoms, more preferably having 2 to 12 carbon atoms, particularly preferably having 2 to 8 carbon atoms, and examples of the alkynylene group include propargylene and 3-pentynylene); arylene group (preferably having 6 to 30 carbon atoms, more preferably having 6 to 20 carbon atoms, particularly preferably having 6 to 12 carbon atoms, and examples of the arylene group include phenylene and naphthylene), or heterocyclic group (preferably having 1 to 30 carbon atoms, more preferably having 1 to 12 carbon atoms, and examples of the heterocyclic group include those, having a hetero atom selected from the group consisting of a nitrogen atom, a oxygen atom and a sulfur atom, such as imidazolyl, pyridyl, quinolyl, furyl, piperidyl, morpholino, benzoxazolyl, benzoimidazolyl and benzthiazolyl).

X is preferably an arylene group. X may have at least on substituent in place of a replaceable hydrogen atom. Examples of the substituent of X are same as those exemplified above as the substituent of $R^1$.

Specific examples of the repeating unit represented by formula (I) include, but are not limited to, those shown below.
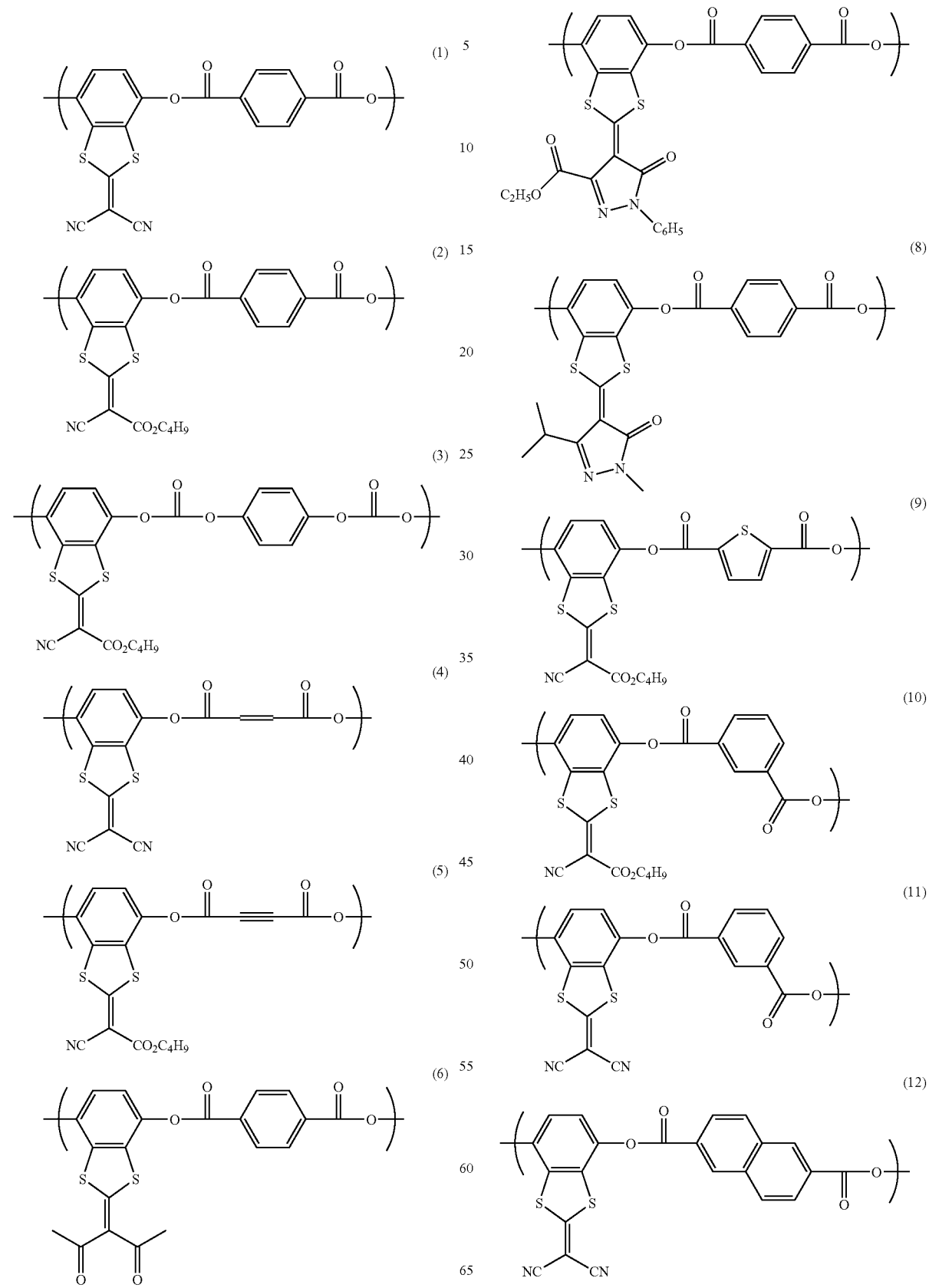

The polymer in the polymer composition of the present invention may comprise other repeating unit(s) along with that represented by formula (I), in terms of the film formability and solubility; and the other repeating unit(s) may be selected from various repeating units without special limitation. According to embodiments comprising the polymer comprising any other repeating unit(s), ratio of contents of the repeating unit represented by formula (I) and the other repeating unit(s) preferably falls in the range from 95:5 to 50:50, and more preferably in the range from 90:10 to 75:25. Specific examples of such other repeating units include, but are not limited to, those shown below.

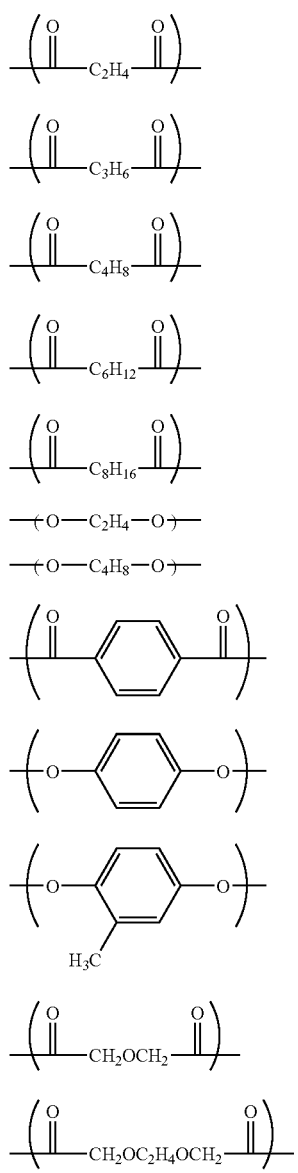

The polymer in the polymer composition of the present invention may be prepared according to a stepwise polymerization reaction such as polycondensation or polyaddition, wherein methods therefor are not specifically limited. Examples of polycondensation include fusion polycondensation employing de-acetylation; fusion polycondensation employing de-phenolization; de-hydrochlorination homogeneous polymerization which is carried out in an organic solvent system allowing the polymer to be dissolved therein by using an organic base and an acid chloride of a dicarboxylic acid compound; and interfacial polycondensation which is carried out in a two-phase system of alkaline aqueous solution and non-water-miscible organic solvent, using an acid chloride of a dicarboxylate compound.

Degree of polymerization of the polymer preferably falls within the range from 3 to 4000 mer, although depending on molecular weight of the repeating units. In terms of physical properties such as strength of the obtainable film, the degree of polymerization is preferably 100 to 4000 mer, more preferably 150 to 3500 mer, and still more preferably 200 to 3000 mer. The degree of polymerization is, however, not limited thereto, because combined use of any other polymer(s) may successfully achieve a sufficient level of strength even with a smaller degree of polymerization. In the embodiments, comprising any other polymer(s) in combination, used for producing a film or the like, the degree of polymerization is preferably not too large in terms of compatibility among the polymers; and 3 to 300 mer or around is preferable, 3 to 250 mer or around is more preferable, and 3 to 200 mer or around is still more preferable. As a consequence, it is to be understood that any polymers having the repeating unit represented by formula (I) include those having a small degree of polymerization, such as being generally referred to as "oligomer", although they may occasionally be referred to as "polymer" in the present invention.

The degree of polymerization may be calculated as a value on the basis of polyethylene oxide (PEO) by gel permeation chromatography (GPC).

The polymer having the repeating unit represented by formula (I) functions as a retardation-controlling agent (in particular, as a retardation enhancer or an agent for controlling wavelength dispersion characteristics of retardation) for optical films. In particular, the polymer functions as a retardation-controlling agent used for obtaining a film excellent in Re expressivity and in wavelength dispersion characteristics of retardation. Such multimer is superior to a monomer having a similar partial structure, in that it may be raised in the degree of alignment. The multimer also may have poorer tendency to crystallize, compared with the monomer, and thereby using the multimer may suppress hazing and bleeding of dissolved ingredients. The multimer may show better compatibility to other polymer(s) and can be added in a larger amount to other polymer(s), compared with the monomer; and using the multimer is advantageous also in terms of brittleness.

The composition of the present invention may contain only a single species of the above-described polymer, or may contain a plurality of species. The composition of the present invention may contain, in addition to the above-described polymer, one species or more of polymer(s) not containing the repeating unit represented by the formula (1) (referred to as "other polymer", hereinafter).

(Other Polymers)

The other polymers are not specifically limited. Examples of them include polyesters, polycarbonates, polyolefins, polyacetylenes, cycloolefinic polymers, norbornene polymers, and cellulose compounds; and cellulose compounds are preferable. One preferred embodiment of the composition of the present invention is a composition comprising the above-described polymer, and the cellulose compound as a major ingredient. The phrase "comprising a cellulose compound as a major ingredient" herein means that an amount of a cellulose compound in the composition is equal to or more than 50% by mass with respect to the total mass of the composition. Preferable, an amount of a cellulose compound in the composition is equal to or more than 75% by mass with respect to the total mass of the composition.

If any other polymer(s), such as the cellulose compound, is used, the amount of the polymer, comprising the repeating unit represented by the formula (1), is preferably 0.1 to 20 parts by mass with respect to the amount of the other polymer(s), more preferably 0.1 to 16 parts by mass, still more preferably 0.5 to 12 parts by mass, and even more preferably 0.5 to 10 parts by mass.

In the present invention, the "cellulose compound" is a compound having a basic structure of cellulose, and may be any compound having a cellulose skeleton originated from cellulose and obtained after being biologically or chemically introduced with functional group(s). The cellulose compound may preferably be cellulose ester, and may more preferably be cellulose acylate (cellulose triacylate, cellulose acylate propionate, and so forth). In the present invention, two or more different species of cellulose compounds may be used in a mixed manner.

Cellulose compounds, which can be used in the invention, will be described in detail. The cellulose compounds are preferably cellulose acylates. Preferred embodiments, employing a cellulose acylate(s), of the invention will be described in detail below.

Examples of a cellulose material, which can be used for preparing the cellulose acylate to be used in the invention, include cotton liters and wood pulps (hardwood pulp, softwood pulp) And any cellulose acylates prepared by using any such cellulose materials are usable herein. If desired, those cellulose materials may be mixed for use herein. The celluloses materials are described in detail, for example, in Marusawa & Uda's "Plastic Material Lecture (17), Cellulose Resin" by Nikkan Kogyo Shinbun (1970) and Hatsumei Kyokai's Disclosure Bulletin 2001-1745 (pp. 7-8), and those celluloses described therein may be usable herein. There should not be any specific limitation to the cellulose acylate film for use in the invention.

The cellulose acylate is preferably selected from esters of mixed aliphatic acids having acetyl(s) and $C_3$ or longer acyl(s) in place of hydrogen atoms of hydroxyls, of which substituent-degrees satisfy the following formulas.

$$2.0 \leq A+B \leq 3.0 \quad (5):$$

$$0 < B \quad (6):$$

In the formulas, "A" indicates a substituent degree with the acetyl group; and "B" indicates a substituent degree with the $C_3$ or longer acyl group.

Cellulose has free hydroxyl groups at the 2-, 3- and 6-positions per the β-1,4-bonding glucose unit thereof. Cellulose acylate is a polymer having acyl group(s) in place of hydrogen atom(s) of all of or part of these hydroxyls. A substituent degree with acyl group means a ratio of esterification at each of the 2-, 3- and 6-positions. That the substituent degree is 1 means 100% esterification.

Preferably, the cellulose acylate has a viscosity-average degree of polymerization from 180 to 700, more preferably from 180 to 550, even more preferably from 180 to 400 and even much more preferably from 180 to 350. When the polymer has a mean degree of polymerization of at most 700, then the viscosity of the cellulose acylate dope may not be too high and the film formation with the dope by casting may be easy. When the polymer has a degree of polymerization of at least 180, it is favorable since the intensity of the film formed of it may increase. The mean degree of polymerization may be measured, for example, according to an Uda et al's limiting viscosity method (Kazuo Uda, Hideo Saito; the Journal of the Society of Fiber Science and Technology of Japan, Vol. 18, No. 1, pp. 105-120, 1962). Concretely, it may be measured according to the method described in JPA No. H9-95538.

The distribution of molecular weight of a cellulose acylate may be determined according to a gel-permeation chromatography method; and preferably, its distribution-index, Mw/Mn, where Mw is a weight-average molecular weight; and Mn is a number-average molecular weight, is small, or in other words, preferably the distribution of molecular weight is narrow. More specifically, the value of Mw/Mn is preferably from 1.0 to 3.0, more preferably from 1.0 to 2.0, and even more preferably from 1.0 to 1.6.

Cellulose acylates from which low-molecular weight ingredients are removed may show a lower viscosity compared with normal cellulose acylate, although they may show a high mean molecular weight (polymerization degree); therefore, such cellulose acylates are useful. Removing low-molecular weight ingredients may be carried out by washing cellulose acylates with appropriate organic solvent. Cellulose acylates containing low-molecular weight ingredients in a small amount may be prepared by using sulfuric acid catalyst in an amount from 0.5 to 25 parts by mass with respect to 100 parts by mass of cellulose. Using sulfuric acid in the above mentioned amount may also contribute to preparing cellulose acylates (having a homogenous distribution of molecular weight) preferred in terms of distribution of molecular weight. The water-content of the cellulose acylate, which can be used in the invention, is preferably equal to or smaller than 2% by mass, more preferably equal to smaller than 1% by mass, and even more preferably equal to or smaller than 0.7% by mass. It is known that general cellulose acylate contains water in a mass ratio from 2.5 to 5%. Such a general cellulose acylate may be dried for reducing its water-content to the above-mentioned range. Drying may be carried out according to any method which can reduce water content to the above mentioned range.

The details of material cottons and preparing process of cellulose acylates are described in Hatsumei Kyokai Disclosure Bulletin (No. 2001-1745, published on Mar. 15, 2001 by the Hatsumei Kyokai), p. 7-12.

If desired, the composition of the present invention may be added with one or more species of additives.

Examples of the additives optionally added to the composition will be explained below.

(Ultraviolet Absorber)

The ultraviolet absorber may be selectable from those of arbitrary species depending on purposes, and more specifically from those of salicylate ester base, benzophenone base, benzotriazole base, benzoate base, cyanoacrylate base, nickel complex salt base and so forth, and more preferably from those of benzophenone base, benzotriazole base and salicylate ester base. Examples of the benzophenone-base ultraviolet absorber include 2,4-dihydroxybenzophenone, 2-hydroxy-4-acetoxybenzophenone, 2-hydroxy-4-methoxybenzophenone, 2,2'-dihydroxy-4-methoxybenzophenone, 2,2'-dihydroxy-4,4'-methoxybenzophenone, 2-hydroxy-4-n-octoxybenzophenone, 2-hydroxy-4-dodecyloxybenzophenone, and 2-hydroxy-4-(2-hydroxy-3-methacryloxy)propoxy benzophenone.

Examples of the benzotriazole-base ultraviolet absorber include 2-(2'-hydroxy-3'-tert-butyl-5'-methylphenyl)-5-chlorobenzotriazole, 2-(2'-hydroxy-5'-tert-butylphenyl)benzotriazole, 2-(2'-hydroxy-3',5'-di-tert-amylphenyl)benzotriazole, 2-(2'-hydroxy-3',5'-di-tert-butylphenyl)-5-chlorobenzotriazole, and 2-(2'-hydroxy-5'-tert-octylphenyl)benzotriazole.

Examples of the salicylate ester base include phenyl salicylate, p-octylphenyl salicylate, and p-tert-butylphenyl salicylate.

Among these exemplified ultraviolet absorbers, 2-hydroxy-4-methoxybenzophenone, 2,2'-dihydroxy-4,4'-methoxy benzophenone, 2-(2'-hydroxy-3'-tert-butyl-5'-methylphenyl)-5-chlorobenzotriazole, 2-(2'-hydroxy-5'-tert-butylphenyl)benzotriazole, 2-(2'-hydroxy-3',5'-di-tert-amylphenyl)benzotriazole, and 2-(2'-hydroxy-3',5'-di-tert-butylphenyl)-5-chlorobenzotriazole are particularly preferable.

Combined use of a plurality of ultraviolet absorbers differing from each other in wavelength of absorption may be preferable, in terms of obtaining an ultraviolet-shielding effect over a wide wavelength range. Ultraviolet absorbers used for liquid crystal may preferably be such as being excellent in absorbance of ultraviolet radiation of 350 nm or shorter wavelength in terms of anti-degradation of liquid crystal, and such as showing only a small absorbance of visible light of 400 nm or longer wavelength from the viewpoint of quality of liquid crystal display. Particularly preferable examples of the ultraviolet absorber include the above-described benzotriazole-base compounds, benzophenone-base compounds, and salicylate ester-base compounds. Among these, the benzotriazole-base compounds are preferable, because they are less causative of unnecessary coloration of cellulose ester.

As the ultraviolet absorber, also compounds described in JPA Nos. S60-235852, H3-199201, H5-1907073, H5-194789, H5-271471, H6-107854, H6-118233, H6-148430, H7-11056, H7-11055, H7-11056, H8-29619, H8-239509 and 2000-204173 may be used.

Amount of addition of the ultraviolet absorber is preferably 0.001 to 5% by mass of the major constituent (cellulose acylate, for example) of the composition, and more preferably 0.01 to 1% by mass. An amount of addition of 0.001% by mass or more is preferable because an effect of addition may sufficiently be expressed, and an amount of addition of 5% by mass or less is preferable in view of suppressing bleeding-out of the ultraviolet absorber onto the surface of the film.

(Anti-Degradant)

An anti-degradant may be added in order to prevent the film from degrading or decomposing. As the anti-degradant, butylamine, hindered amine compounds (JPA No. H8-325537), guanidine compounds (JPA No. H5-271471), benzotriazole-base UV absorbers (JPA No. H6-235819), benzophenone-base UV absorbers (JPA No. H6-118233) and so forth are adoptable.

(Plasticizer)

Plasticizer may preferably be phosphate ester and/or carboxylate ester. The phosphate ester-base plasticizer may preferably be exemplified by triphenyl phosphate (TPP), tricresyl phosphate (TCP), cresyl diphenyl phosphate, octyl diphenyl phosphate, biphenyl diphenyl phosphate (BDP), trioctyl phosphate, and tributyl phosphate. The carboxylate ester-base plasticizer may preferably be exemplified by dimethyl phthalate (DMP), diethyl phthalate (DEP), dibutyl phthalate (DBP), dioctyl phthalate (DOP), diphenylphthalate (DPP), diethylhexylphthalate (DEHP), O-acetyl triethyl citrate (OACTE), tributyl O-acetyl citrate (OACTB), acetyltriethyl citrate, acetyltributyl citrate, butyl oleate, methyl acetyl ricinoleate, dibutyl sebacate, triacetin, tributyrin, butylphthalylbutyl glycolate, ethylphthalylethyl glycolate, methylphthalylethyl glycolate, and butylphthalylbutyl glycolate. The plasticizer is further preferably any of (di)pentaerythritol esters, glycerol esters and diglycerol esters.

(Peeling Aid)

Examples of the peeling aid which can be used in the invention include ethyl esters of citric acid.

(Infrared Absorber)

The compounds described in JPA No. 2001-194522 may be preferable as infrared absorber.

(Dye)

In the present invention, dyes may be added for the purpose of color adjustment. Content of the dye(s) is preferably 10 to 1000 ppm, and more preferably 50 to 500 ppm, on the mass basis with respect to the major constituent (cellulose acylate, for example) of the composition. By allowing the composition to include the dye(s) in this way, light piping of the film may be reduced, and yellowing of the film may be improved.

(Matting Agent Particle)

Particles may be added as a matting agent. The particles may be exemplified by those made of silicon dioxide, titanium dioxide, aluminum oxide, zirconium oxide, calcium carbonate, calcium carbonate, talc, clay, calcined kaolin, calcined calcium silicate, hydrated calcium silicate, aluminum silicate, magnesium silicate and calcium phosphate. Those containing silicon may be more preferable as the particles in view of lowering turbidity, and silicon dioxide may be more preferable. Particles of silicon dioxide preferably has a primary mean particle size of 20 nm or smaller, and an apparent specific gravity of 70 g/l or larger. Those having a primary mean particle size of as small as 5 to 16 nm may be more preferable in view of reducing haze of the film. The apparent specific gravity is preferably 90 to 200 g/l or larger, and more preferably 100 to 200 g/l or larger. Lager apparent specific gravity allows preparation of dispersion liquid of higher concentration, and is therefore preferable in view of improving haze and aggregate.

These particles generally form secondary particles having a mean particle size of 0.1 to 3.0 μm, exist in the film in a form of aggregate of the primary particles, and produce irregularities as large as 0.1 to 3.0 μm on the surface of the film. The secondary mean particle size is preferably 0.2 μm to 1.5 μm, more preferably 0.4 μm to 1.2 μm, and still more preferably 0.6 μm to 1.1 μm. The primary/secondary particle sizes were represented by diameters of circumscribing circles of the particles in the film, observed under a scanning electron microscope. The mean particle sizes were determined by averaging the observed values obtained from 200 particles at different sites.

Silicon dioxide particles adoptable herein are commercially available typically under the trade names of Aerosil R972, R972V, R974, R812, 200, 200V, 300, R202, OX50, and TT600 (from Nippon Aerosil Co., Ltd.). Zirconium oxide particles are commercially available typically under the trade names of Aerosil R976 and R811 (from Nippon Aerosil Co., Ltd.), and any of which are adoptable.

Among these, Aerosil 200V and Aerosil R972V are silicon dioxide particles having a primary mean particle size of 20 nm or smaller and an apparent specific gravity of 70 g/l or larger, and are particularly preferable, by virtue of their effect of reducing friction coefficient while keeping turbidity of the film to a low level.

In order to obtain a film containing particles having a small secondary mean particle size, there are several possible techniques of preparing a particle dispersion. For example, one feasible method is such as preliminarily preparing a particle dispersion having a solvent and particles mixed therein under stirring, then adding and dissolving the particle dispersion into a separately-obtained small amount of polymer solution (cellulose acylate, for example solution) under stirring, before casting. This method of preparation is preferable in that dispersibility of the silicon dioxide particles is excellent, and that the silicon dioxide particles may be made further less likely to re-coagulate. Another possible method is such as adding a small amount of main constituent polymer (cellulose acylate, for example) to a solvent, dissolving it under stirring, adding the particles thereto, dispersing the mixture in a dispersion machine to produce a liquid for adding particles, and then thoroughly mixing the liquid for adding particles with a dope in an inline mixer. Concentration of the particles when they are mixed with and dispersed in a solvent and so forth is preferably 5 to 30% by mass, more preferably 10 to 25% by mass, and still more preferably 15 to 20% by mass. Higher concentration of dispersion may lower the turbidity of the liquid relative to the amount of addition, and may be preferable because the haze and aggregate are improved. The amount of addition of matting agent in the final dope is preferably 0.01 to 1.0 g per 1 m², more preferably 0.03 to 0.3 g, and still more preferably 0.08 to 0.16 g. Lower alcohols adoptable herein may preferably be exemplified by methyl alcohol, ethyl alcohol, propyl alcohol, isopropyl alcohol, butyl alcohol and so forth. Solvents other than the lower alcohols may not specifically be limited, wherein any solvents adoptable to production of the film may preferably be used.

(Ratio of Additives)

In the composition of the present invention, the total amount of compounds having molecular weights of 3000 or smaller is preferably 5 to 45% by mass, more preferably 10 to 40% by mass, and still more preferably 15 to 30% by mass, relative to the mass of the major constituent polymer (cellulose acylate, for example). The above-described additives may correspond to these compounds. It is more preferable that the total amount of compounds having molecular weights of 2000 or smaller preferably falls in the above-described ranges. By adjusting the amount to the above-described ranges, the film may be made less likely to cause changes in the optical characteristics and physical strength against changes in temperature and moisture. By adjusting the total amount of these compounds to the above-described ranges, these compounds may successfully be prevented from exceeding the compatibility limit, and from depositing onto the surface of the film (bleeding out from the film) to make the film turbid.

These additives may be added at any time into the composition. When the film is produced by the solvent casting method described later, the additives may be added to the dope to be cast, at any time in the process of preparation.

These additives may be a solid or oily substance. In other words, they are not specifically limited in terms of their melting points or boiling points. For example, an ultraviolet absorber having a melting point of 20° C. or lower and an ultraviolet absorber having a melting point of higher than 20° C. may be used in a mixed manner, or the plasticizers may similarly be used in a mixed manner. More specifically, the methods described in JPA No. 2001-151901 are adoptable.

[Film]

The present invention relates also to a film comprising the polymer comprising the repeating unit represented by formula (1). A preferable example of the film of the present invention is a cellulose acylate film. The polymer comprising the repeating unit represented by formula (1) shows reversed wavelength dispersion characteristics of birefringence $\Delta n$ over the wavelength range of visible light (that is, shows smaller $\Delta n$ in shorter wavelength region), based on structural features of its molecule, when formed into a film alone or together with any other polymer(s).

Molecules of constituent material of film generally align in a predetermined direction in the film. Birefringence $\Delta n$ of a film is given by subtracting refractive index in the direction (referred to as the MD, hereinafter) normal to the direction of alignment (referred to as the TD, hereinafter) from refractive index in the TD, so that if the wavelength dispersion characteristics of refractive index in the TD shows a rightwardly descending profile (slope of $\Delta n$ assuming longer wavelength on the right side and shorter wavelength on the left side) larger than that in the MD, the difference may satisfy:

$$1 > |\Delta n(450\text{ nm})/\Delta n(550\text{ nm})|; \text{ and} \qquad (3):$$

$$1 < |\Delta n(630\text{ nm})/\Delta n(550\text{ nm})|. \qquad (4):$$

This means reversed wavelength dispersion characteristics.

Wavelength dispersion characteristics of refractive index are closely related to absorption by substance, as expressed by the Lorentz-Lorenz's equation. A film, showing wavelength dispersion characteristics in the MD more largely lowered than that in the TD, may show an absorption transition along the MD at the longer wavelength than that along the TD. The polymer comprising the repeating unit represented by formula (I) shows the absorption transition at the longer wavelength region along the width direction of each polymer molecule (MD); and therefore, a film comprising the polymer may satisfy the expressions (3) and (4) in the above, or may show reversed wavelength dispersion characteristics with respect to $\Delta n$.

It is to be understood that the polymer having refractive index larger in the TD than in the MD allows the film to naturally show positive birefringence $\Delta n$ (550 nm) with respect to the TD, whereas even the polymer conversely having refractive index larger in the MD than in the TD allows the film to show positive birefringence $\Delta n$ (550 nm), if the polymer material (the composition of the invention) has refractive index larger in the TD.

By using the composition of the present invention, the film showing reversed wavelength dispersion characteristics of birefringence $\Delta n$ may be produced. One example of the film of the present invention may show the wavelength dispersion characteristics satisfying the relational expressions (1) and (2) below:

$$0.5 < \Delta n(450\text{ nm})/\Delta n(550\text{ nm}) < 1.0; \text{ and} \qquad (1):$$

$$1.05 < \Delta n(630\text{ nm})/\Delta n(550\text{ nm}) < 1.5. \qquad (2):$$

In these relations, wavelength 450 nm, 550 nm and 630 nm correspond to blue, green and red, respectively. In view of improving viewing angle characteristics of liquid crystal display devices, it is preferable to optimize retardation of the film for each wavelength. The film of the present invention preferably has a positive birefringence $\Delta n(550)$ at 550 nm, appropriately adjusted in terms of $\Delta n(450)$ and $\Delta n(630)$, and preferably satisfies relational expressions (1) and (2).

Optical characteristics, which are more specifically Re value and Rth value, of the film of the present invention may be adjustable to preferable ranges, by appropriately selecting species and amount of addition of the repeating unit used herein represented by formula (I), and for the embodiments of stretched films (stretching the film may be described in detail later), by appropriately adjusting the factor of stretching. For example, a desired Rth value may be achieved by selecting a polymer comprising the repeating unit represented by formula (I), and a desired Re value may be achieved by appropriately selecting the amount of addition and/or by setting the factor of stretching of the film.

The film of the present invention may be produced according to a solvent casting method or a melting casting method.

Examples of the solvent casting method which can be used in the invention will be described in detail, but are not limited to those below.

(Solvent Casting Method)

In the solvent casting method, the composition of the present invention is dissolved into an organic solvent to thereby prepare a solution (dope), and the film is made using the dope. Main solvent used for preparing the dope may preferably be an organic solvent, and may preferably be selected from ester, ketone and ether having 3 to 12 carbon atoms, and halogenated hydrocarbon having 1 to 7 carbon atoms. Each of the ester, ketone and ether may have a cyclic structure. Also compounds having any two or more functional groups of the ester, ketone and ether (more specifically, —O—, —CO— and COO—) are adoptable as the main solvent, and they may have still another functional group such as alcoholic hydroxyl group. For the case of the main solvent having two or more species of functional groups, the number of carbon atoms thereof may be within the specified ranges of that of compounds having any of these functional groups.

Main solvent may be selected from chlorinated solvents such as halogenated (chlorinated) hydrocarbons or selected from non-chlorinated solvents as described in Journal of Technical Disclosure (No. 2001-1745, p. 12-16, published on Mar. 15, 2001, by Japan Institute of Invention and Innovation).

Preferable examples of the method of preparing the dope and preferable examples of the solvent are described in JPA Nos. 2000-95876, H12-95877, H10-324774, H8-152514, H10-330538, H9-95538, H9-95557, H10-235664, H12-63534, H11-21379, H10-182853, H10-278056, H10-279702, H10-323853, H10-237186, H11-60807, H11-152342, H11-292988, H11-60752 and H11-60752.

In the process of preparing the dope, methods of solubilization are not specifically limited, allowing even solubilization under room temperature, and may be carried out based on cooled solubilization or high-temperature solubilization, or combination of these methods. Process of producing detailed in JIII Journal of Technical Disclosure (No. 2001-1745, p. 22-25, published on Mar. 15, 2001, by Japan Institute of Invention and Innovation) may preferably be adopted to preparation of the dope, and to the individual processes of concentration and filtration of the solution associating the process of solubilization.

Transparency of the dope used for producing the film of the present invention may preferably be 85% or above, and more preferably 90% or above. A specific method of calculating transparency of the dope may be such as placing the dope in an 1-cm-square glass cell, and measuring absorbance at 550 nm using a spectrophotometer (model UV-3150, from Simadzu Corporation). Solvent only is preliminarily measured as a blank, and the transparency is calculated based on subtraction of the blank absorbance.

The prepared dope is once taken out from a solubilizer (tank) into a storage tank, and defoamed there to purge bubbles contained in the dope, to obtain a final dope. The dope is then sent out from a discharge port into a pressure die through a pressurized metering pump capable of precisely feeding a constant volume of dope based on the number of rotation, uniformly cast from a mouthpiece (slit) of the pressure die onto a metal support in a casting zone, under endless traveling, and half-dried film of dope (also referred to as web) is separated from the metal support at a point of separation reached after approximately a single round of travel. The obtained web is then held at both ends, transferred and dried by a tenter while keeping the width, the obtained film is then mechanically transferred through a roll series of a drier, and after drying, a predetermined length of the film is taken up onto a roll using a winder. Combination of the tenter and the drier having the roll series of drier may be determined, depending on purposes.

The film of the present invention may be used as a functional protective film, which is an optical component of electronic displays, or as a photosensitive material for silver halide photograph. In such embodiments, an underliner, anti-static layer, anti-halation layer, protective film or the like may be formed on the film. For these purposes, a coating apparatus is used along with the solvent casting apparatus. These techniques are described in details in JIII Journal of Technical Disclosure (No. 2001-1745, p. 25-30, published on Mar. 15, 2001, by Japan Institute of Invention and Innovation), while being categorized into casting (including co-casting), metal support, drying, separation and so forth, all of which being preferably adoptable to the present invention.

The film produced according to the above-described method may be used, without modification, to various applications. The film may be used also after being adjusted to some desired optical characteristics by stretching. In particular, the film, having a large value of retardation in plane, may be prepared by carrying out a stretching in the width direction, according to the methods described typically in JPA Nos. S62-115035, H4-152125, H4-284211, H4-298310, and H11-48271.

The film may be stretched under room temperature or under heating conditions. Temperature of heating is preferably lower than the glass transition point of the film. Stretching of the film may be uniaxial stretching effected only in the longitudinal or transverse direction, or may be simultaneous or sequential biaxial stretching. The film may preferably be stretched to as long as 1 to 200%, more preferably 1 to 100%, and still more preferably 1 to 50%.

The stretching step may be carried out in the middle of the process of producing the film, or after rolling-up the film. In the former embodiments, the film may be stretched while containing some residual solvent, wherein the film may preferably be stretched while containing the content of residual solvent at 2 to 30% by mass.

The film of the present invention to be used as a protective film of a polarizing film is often disposed so that the transmission axis of the polarizing film and the in-plane slow axis of the film are parallel to each other. The long polarizing film continuously produced generally has the transmission axis parallel to the width direction of the film. In order to bond such long polarizing film with the long film of the present invention continuously, preferably, the in-plane slow axis of the film of the present invention is along the width direction of the film. For preparing such a film, stretching is preferably carried out with a larger degree in the width direction.

Thickness of the film of the present invention may vary depending on purposes of use, preferably adjusted in the range from 5 to 500 μm, more preferably from 20 to 300 μm, and still more preferably from 30 to 150 μm. For optical purposes, in particular for use as an optical film for VA-mode liquid crystal display device, the thickness may preferably be adjusted to 40 to 110 μm. The thickness of the film may be adjustable typically by adjusting solid content of the dope, slit width of the mouthpiece of the die, extrusion pressure from the die, or travel speed of the metal support, so as to achieve a desired thickness.

One embodiment of thus-obtained film of the present invention is a long film having a width of 0.5 to 3 m (preferably 0.6 to 2.5 m, and more preferably 0.8 to 2.2 m), and a length of 100 to 10000 m (more preferably 500 to 7000 m, and still more preferably 1000 to 6000 m), given in a form of being taken up onto a roll. The film may preferably be knurled in the process of winding at least on one edge thereof, wherein width of knurling may preferably be 3 mm to 50 mm, and more preferably 5 mm to 30 mm, height thereof may preferably be 0.5 to 500 µm, and more preferably 1 to 200 µm. The knurling may be provided by one-side pressing or both-side pressing.

The film may be used as an optical compensation film of liquid crystal display devices, and in such an embodiment, variation in the Re(590) value in the width direction is preferably suppressed to as small as ±5 nm, and more preferably to ±3 nm. Variation in the Rth(590) value in the width direction is preferably suppressed to as small as ±10 nm, and more preferably to ±5 nm. Also variations in the Re value and the Rth value in the longitudinal direction are preferably suppressed within the ranges of variations in the width direction.

(Measurement of Re or Rth of Film)

In the description, Re($\lambda$) and Rth($\lambda$) each indicate retardation in plane (unit: nm) and retardation along thickness direction (unit: nm) at a wavelength $\lambda$. Re($\lambda$) is measured by applying a light having a wavelength of $\lambda$ nm in the normal line direction of a sample such as a film, using KOBRA-21ADH or WR (by Oji Scientific Instruments).

When the sample (a film) to be tested is represented by an uniaxial or biaxial refractive index ellipsoid, then its Rth($\lambda$) is calculated according to the method mentioned below.

With the in-plane slow axis (determined by KOBRA 21ADH or WR) taken as the inclination axis (rotation axis) of the sample (in case where the sample has no slow axis, the rotation axis of the sample may be in any in-plane direction of the sample), Re($\lambda$) of the sample is measured at 6 points in all thereof, up to +50° relative to the normal line direction of the sample at intervals of 10°, by applying a light having a wavelength of $\lambda$ nm from the inclined direction of the sample.

With the in-plane slow axis from the normal line direction taken as the rotation axis thereof, when the sample has a zero retardation value at a certain inclination angle, then the symbol of the retardation value of the sample at an inclination angle larger than that inclination angle is changed to a negative one, and then applied to KOBRA 21ADH or WR for computation.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (13) and (14):

When the sample to be tested can not be represented by a uniaxial or biaxial index ellipsoid, or that is, when the sample does not have an optical axis, then its Rth($\lambda$) may be calculated according to the method mentioned below.

With the in-plane slow axis (determined by KOBRA 21ADH or WR) taken as the inclination axis (rotation axis) of the sample, Re($\lambda$) of the sample is measured at 11 points in all thereof, from −50° to +50° relative to the normal line direction of the sample at intervals of 10°, by applying a light having a wavelength of $\lambda$ nm from the inclined direction of the sample. Based on the thus-determined retardation data of Re($\lambda$), the mean refractive index and the inputted thickness of the sample, Rth($\lambda$) of the sample is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

(Measurement of Moisture Permeability of Film)

Moisture permeability of the film of the present invention, measured conforming to JIS Z0208 at 60° C. and 95% RH (relative humidity), and assumed as having a thickness of 80 µm, is preferably 400 to 2000 g/m²·24 h, more preferably 500 to 1800 g/m²·24 h, and particularly preferably 600 to 1600 g/m²·24 h. By adjusting the moisture permeability to 2000 g/m²·24 h or below, absolute values of moisture dependence of Re value and Rth value of the film will successfully be made less likely to exceed 0.5 nm/% RH. The absolute values of moisture dependence of Re value and Rth value of the film will successfully be made less likely to exceed 0.5 nm/% RH, also for the case where the film (preferably cellulose acylate film) of the present invention is stacked with an optically anisotropic film to give an optical compensation film. Liquid crystal display devices incorporated with these optical compensation sheet and polarizing plate may cause color shift or reduction in the viewing angle. In addition, by adjusting moisture permeability of the film (preferably cellulose acylate film) to 400 g/m²·24 h or larger and then by bonding such a film on both surfaces of a polarizing film to prepare a polarizing plate, it is possible to prevent adhesive from drying and to prevent the polarizing plate from suffering adhesion failure.

$$\text{Re}(\theta) = \left[ nx - \frac{(ny \times nz)}{\left( \sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}\right)} \right] \times \frac{d}{\cos\left(\sin^{-1}\left(\frac{\sin(-\theta)}{nx}\right)\right)} \quad (13)$$

$$Rth = \left(\frac{nx+ny}{2} - nz\right) \times d \quad (14)$$

wherein Re($\theta$) means the retardation value of the sample in the direction inclined by an angle $\theta$ from the normal line direction; nx means the in-plane refractive index of the sample in the slow axis direction; ny means the in-plane refractive index of the sample in the direction vertical to nx; nz means the refractive index of the sample vertical to nx and ny; and d is a thickness of the sample.

As a general tendency, thicker film (preferably cellulose acylate film) will have smaller moisture permeability, whereas thinner film will have larger moisture permeability. Values of the moisture permeability described in the present invention are given assuming the thickness of the film as 80 µm. The calculation herein may be given as (moisture permeability on the 80-µm basis=actual moisture permeability× actual thickness (µm)/80 (µm)).

The methods described in "Kobunshi no Bussei II (Physical Properties of Polymers II)" (Kobunshi Jikken Kagaku Koza 4 (Course of Polymer Experiment 4), published by Kyoritsu Shuppan Co., Ltd.), p. 285-294, "Jokiatsu no Sokutei (Sitsuryo-ho, Ondokei-ho, Kyuchakuryo-ho)" (Measurement of Vapor Pressure (Mass Method, Vapor Pressure Method, Amount-of-Adsorption Method) are adoptable to measurement of moisture permeability, wherein a 70-mmφ sample of the film of the present invention (preferably cellulose acylate film) is conditioned in moisture respectively under 25° C., 90% RH and 60° C., 95% RH for 24 hours, moisture content per unit area (g/m$^2$) is calculated according to JIS Z0208 using a moisture permeability tester (model KK-709007, from Toyo Seiki Seisaku-sho, Ltd.), and moisture permeability is calculated by:

$$\text{moisture permeability} = (\text{mass after conditioned in moisture}) - (\text{mass before conditioned in moisture}).$$

(Content of Residual Solvent)

In the present invention, the film (preferably a cellulose acylate film) may preferably be dried under conditions so as to adjust the content of residual solvent in the film to the range from 0.01 to 1.5% by mass, more preferably 0.01 to 1.0% by mass. The film of the present invention (preferably a cellulose acylate film), aimed at being applied to a support, curling may be suppressed by adjusting the content of residual solvent within such ranges. This is supposedly because reduction in free volume, ascribable to reduced content of residual solvent in the process of film making by the solvent casting method, may play a major role.

(Coefficient of Hygroscopic Expansion of Film)

Coefficient of hygroscopic expansion of the film of the present invention (preferably a cellulose acylate film) is preferably adjusted to $30 \times 10^{-5}$/% RH or smaller, more preferably $15 \times 10^{-5}$/% RH or smaller, and still more preferably $10 \times 10^{-5}$/% RH or smaller. While the lower limit value is not specifically limited, it is generally believed that smaller coefficient of hygroscopic expansion is more preferable, wherein the value may more preferably be $1.0 \times 10^{-5}$/% RH or above. The coefficient of hygroscopic expansion indicates the amount of change in length of the sample, under varied relative humidity at a constant temperature. By adjusting the coefficient of hygroscopic expansion, the film of the present invention (preferably a cellulose acylate film), adopted as a support for the optical compensation film, may be prevented from causing frame-like elevation in the transmissivity, that is, distortion-induced leakage of light, while keeping optical compensation function of the optical compensation film unchanged.

The film of the present invention may have other functional layers (for example, undercoat layer and backing layer). The film may still also be subjected to surface treatment for the purpose of improving adhesiveness with the functional layers. Examples of the surface treatment include glow discharge treatment, ultraviolet irradiation, corona treatment, flame treatment, acid or alkali treatment. The glow discharge treatment herein may preferably be proceeded using a low-temperature plasma excited in a low-pressure gas at $10^{-3}$ to 20 Torr (0.133 Pa to 2.67 kPa), or in plasma under atmospheric pressure. Examples of plasma-inducible gas, capable of being excited to produce plasma under above-described conditions, include argon, helium, neon, krypton, xenon, nitrogen, carbon dioxide, flons such as tetrafluoromethane, and mixture of these gases. These gases are detailed in JIII Journal of Technical Disclosure (No. 2001-1745, p. 30-32, published on Mar. 15, 2001, by Japan Institute of Invention and Innovation), and are preferably adoptable also to the present invention.

Alkali saponification is effective particularly for cellulose acylate film, and may preferably be carried out according to a method of directly immersing the film into a saponification liquid, or according to a method of coating a saponification liquid onto the film. Examples of the method of coating include dip coating, curtain coating, extrusion coating, bar coating and E-mode coating. Considering that the saponification liquid is coated on the film, solvent used for preparing the coating liquid for alkali saponification may preferably be selected from those excellent in wettability, and capable of keeping a good surface condition of the film without producing irregularities due to the solvent for saponification. More specifically, alcoholic solvent may be preferable, and isopropyl alcohol may particularly be preferable. Alternatively, an aqueous solution of a surfactant may be used as the solvent. Alkali contained in the coating liquid for alkali saponification may preferably be soluble to the solvent, and may more preferably be KOH or NaOH. The coating liquid for saponification preferably has a pH value of 10 or higher, and more preferably 12 or higher. As for reaction conditions for the alkali saponification, 1 second to 5 minutes at room temperature may be preferable, wherein 5 seconds to 5 minutes may be more preferable, and 20 seconds to 3 minutes may be particularly preferable. After the alkali saponification, the surface on which the coating liquid for saponification was coated may preferably be washed with water, followed by washing with an acid, and further with water.

The film of the present invention may be used as a component in various fields. In particular, the film is suitable for optical material and photographic material. The film is particularly suitable for optical films for liquid crystal display devices. The film is suitable for an optical compensation film compensating birefringence of the liquid crystal cell, and as a protective film of the polarizing film.

The film of the present invention to be used as an optical film for liquid crystal display devices may have at least any one of functional layers thereon. Examples of the functional layers include antistatic layer, cured resin layer (transparent hard-coat layer), anti-reflection film, anchor-coat layer, anti-glare layer, optical compensation layer, alignment layer and cured liquid crystal layer. Examples of the materials of the functional layers include surfactants, slipping agents, matting agents, anti-static agents and materials for composing hard-coat layer, which are described in detail in JIII Journal of Technical Disclosure (No. 2001-1745, p. 32-45, published on Mar. 15, 2001, by Japan Institute of Invention and Innovation).

[Polarizing Plate]

The film of the present invention (preferably a cellulose film) may be useful as a protective film particularly for polarizing plate. The film to be used as a protective film may be produced according to any method. One examples of the method is as follows. Two films of the invention are prepared and subjected to an alkali treatment, and they are respectively bonded on each of surfaces of a polarizing film by using an aqueous solution of completely saponified polyvinyl alcohol. The polarizing film may be produced as follows. A polyvinyl alcohol film is dipped in an iodine solution and stretched. Alternatively, forming an adhesive layer such as described in JPA Nos. H6-94915 and H6-118232 may be provided to the film, in place of the alkali treatment.

Examples of the adhesive, which can be used for bonding the film of the present invention (more specifically, the treated surface of thereof) and the polarizing film, include polyvinyl alcohol-base adhesives such as polyvinyl alcohol, polyvinyl butyral and so forth, and vinyl-base latex such as butyl acrylate and so forth.

The polarizing plate comprises a polarizing film and protective films protecting both surfaces thereof, and may further comprise a protection film disposed on one surface thereof, and a separation film disposed on the opposite surface thereof. The protection film and the separation film are used for the purpose of protecting the polarizing plate, at the time of shipping and product inspection of the polarizing plate. The protection film may be bonded for the purpose of protecting the surface of the polarizing plate, and is therefore disposed on the side of the polarizing plate opposite to the surface thereof to be bonded to the liquid crystal cell. On the other hand, the separation film is used for the purpose of covering the adhesive layer to be brought into contact with the liquid crystal cell, and is therefore disposed on the side of the polarizing plate brought into contact with the liquid crystal cell.

Liquid crystal display device generally comprises a cell containing a liquid crystal, held between two polarizing plates, wherein the polarizing plate having the film of the present invention may be incorporated into the liquid crystal display device, so as to dispose the film anywhere, wherein the film of the present invention is preferably disposed between the liquid crystal cell and the polarizing film.

[Optical Compensation Film (Retardation Plate)]

The film of the present invention may be useful as an optical compensation film of liquid crystal display devices. The optical compensation film herein means an optical component generally used for liquid crystal display devices, aimed at compensating birefringence of the liquid crystal layer, and is synonymous with retardation plate, optical compensation sheet and so forth. The optical compensation film shows birefringence, and is used for removing coloration of the screen of the liquid crystal display device, and for improving the viewing angle characteristics.

Optical characteristics required for the optical compensation film may vary depending on the modes of liquid crystal display devices to which the film is adopted.

For example, the optical compensation film used for improving viewing angle characteristics of VA-mode and OCB-mode liquid crystal display devices preferably has an $Re(\lambda)$ value and an $Rth(\lambda)$ value respectively satisfying relational expressions (7) and (8) below. The films satisfying the relational expressions, (7) and (8), are also preferable to be used as a protective film of the polarizing plate provided on the liquid crystal cell side thereof.

$$0 \text{ nm} \leq Re(590) \leq 200 \text{ nm; and} \tag{7}$$

$$0 \text{ nm} \leq Rth(590) \leq 400 \text{ nm}. \tag{8}$$

They are more preferably given as:

$$30 \text{ nm} \leq Re(590) \leq 150 \text{ nm; and} \tag{7-1}$$

$$30 \text{ nm} \leq Rth(590) \leq 300 \text{ nm}. \tag{8-1}$$

There may be two possible embodiments of the film of the present invention to be used for the VA-mode or OCB-mode liquid crystal display device, one of which is an embodiment (dual mode) of using the film one by one, therefore two in total, on both sides of the cell, and an embodiment (single mode) of using the film only on either side of the upper and lower sides of the cell.

In the dual mode, Re(590) of each film is preferably 20 to 100 nm, and more preferably 30 to 70 nm. As for Rth(590) of each film, the range from 70 to 300 nm is preferable, and 100 to 200 nm is more preferable.

In the single mode, Re(590) of the film is preferably 30 to 150 nm, and more preferably 40 to 100 nm. As for Rth(590) of the film, the range from 100 to 300 nm is preferable, and 150 to 250 nm is more preferable.

The film of the present invention to be used as an optical compensation film may be disposed so that the transmission axis of the polarizing film and the slow axis of the film of the present invention are crossed with any angle. The film of the present invention to be use as a protective film, the film may be disposed so that the slow axis of the film is parallel to the transmission axis of the polarizing film, as described in the above.

[Liquid Crystal Display Device]

The present invention relates also to a liquid crystal display device comprising the film of the present invention and/or the polarizing plate of the present invention.

The liquid crystal display device generally comprises a liquid crystal cell having liquid crystal held between two substrates with electrodes, and two polarizing plates disposed one by one on both sides thereof. The film of the present invention is preferably used as an optical compensation film disposed between the liquid crystal cell and the polarizing film, or as a protective film of the polarizing film.

The liquid crystal display device of the invention may employ any mode such as a TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), ECB (Electrically Controlled Birefringence), VA (Vertically Aligned) and HAN (Hybrid Aligned Nematic) modes. The liquid crystal display device may have a multi-domain structure. The liquid crystal display device may be a transmissive, reflective or transreflective mode device.

(TN-Mode Liquid Crystal Display Device)

The film of the present invention may be used as a support of an optical compensation sheet for a TN-mode liquid crystal display device having a TN-mode liquid crystal cell. The TN-mode liquid crystal cell and the TN-mode liquid crystal display device have been known. An optical compensation sheet used for the TN-mode liquid crystal display device may be produced according to the methods described in JPA Nos. H3-9325, H6-148429, H8-50206 and H9-26572, or published papers by Mori et al., (Jpn. J. Appl. Phys., Vol. 36 (1997), p. 143 and Jpn. J. Appl. Phys., Vol. 36 (1997), p. 1068).

(STN-Mode Liquid Crystal Display Device)

The film of the present invention may be used also as a support of an optical compensation sheet for an STN-mode liquid crystal display device having an STN-mode liquid crystal cell. Generally in the STN-mode liquid crystal display device, rod-like liquid crystalline molecules in the liquid crystal cell are twisted at an angle of 90 to 360°, and product ($\Delta$nd) of anisotropy of refractive index ($\Delta$n) of the rod-like liquid crystalline molecules and cell gap (d) falls in the range from 300 to 1500 nm. An optical compensation sheet adoptable to the STN-mode liquid crystal display device may be produced according to the method described in JPA No. 2000-105316.

(VA-Mode Liquid Crystal Display Device)

The film of the present invention may advantageously be used as a support for an optical compensation sheet of a VA-mode liquid crystal display device having a VA-mode liquid crystal cell. The optical compensation sheet to be adopted to the VA-mode liquid crystal display device is preferably adjusted to have an Re value of 0 to 150 nm, and an Rth value of 70 to 400 nm. In the embodiments wherein two optically anisotropic polymer films are used for the VA-mode liquid crystal display device, the films preferably have an Rth value of 70 to 250 nm. In the embodiments wherein a single optically anisotropic polymer film is used for the VA-mode liquid crystal display device, the film preferably has an Rth value of 150 to 400 nm. The VA-mode liquid crystal display device may employ a multi-domain system as described typically in JPA No. H10-123576.

(IPS-Mode Liquid Crystal Display Device and ECB-Mode Liquid Crystal Display Device)

The film of the present invention is advantageously used also as supports of optical compensation sheets, or as protective films of the polarizing plates, of an IPS-mode liquid crystal display device and an ECB-mode liquid crystal display device comprising an IPS-mode liquid crystal cell and an ECB-mode liquid crystal cell, respectively. These modes are characterized in that the liquid crystal materials are aligned almost horizontally with respect to the substrate in the black state. More specifically, the black state is obtained by allowing liquid crystal molecules to align horizontally with respect to the surfaces of the substrates in the absence of applied voltage. In these embodiments, the polarizing plates comprising the film of the present invention may contribute to improvement in color, expansion of viewing angle, and improvement in contrast. In these embodiments, the polarizing plate, comprising the film of the present invention as a protective film, is preferably disposed on either the upper or lower surface of the liquid crystal cell, so that the film is disposed between the polarizing film and the liquid crystal cell. It may be still more preferable to dispose an optically anisotropic layer between the protective film of the polarizing film and the liquid crystal cell, and retardation value of thus disposed optically anisotropic layer is adjusted to twice or less as large as Δn·d of the liquid crystal layer.

(OCB-Mode Liquid Crystal Display Device and HAN-Mode Liquid Crystal Display Device)

The film of the present invention is advantageously adoptable also as supports of optical compensation sheets of an OCB-mode liquid crystal display device comprising an OCB-mode liquid crystal cell, or a HAN-mode liquid crystal display device comprising a HAN-mode liquid crystal cell. The optical compensation sheet used for the OCB-mode liquid crystal display device or the HAN-mode liquid crystal display device preferably has direction in which the absolute value of retardation value is minimized, not in the in-plane direction nor in the normal line direction of the optical compensation sheet. Also the optical characteristics of the optical compensation sheet used for the OCB-mode liquid crystal display device or the HAN-mode liquid crystal display device may be determined, depending on optical characteristics of the optically anisotropic layer, optical characteristics of the support, and positions of the optically anisotropic layer and the support. The optical compensation sheet adoptable to the OCB-mode liquid crystal display device or the HAN-mode liquid crystal display device may be produced, according to the method described in JPA No. H9-197397, or in a published paper by Mori et al. (Jpn. J. Appl. Phys., Vol. 38 (1999), p. 2837).

(Reflective Liquid Crystal Display Device)

The film of the present invention may advantageously be used also as the optical compensation sheets of TN-mode, STN-mode, HAN-mode and GH (Guest-Host)-mode reflective liquid crystal display devices. These display modes have been known. The TN-mode reflective liquid crystal display device may be produced according to the methods described in JPA No. H10-123478, International Patent WO98/48320 pamphlet, and Japanese Patent No. 3022477. The optical compensation sheet adoptable to the reflective liquid crystal display device may be produced according to the description of International Patent WO00/65384.

(Other Liquid Crystal Display Device)

The film of the present invention may advantageously be used also as the support of the optical compensation sheet of an ASM (Axially Symmetric Aligned Microcell)-mode liquid crystal display device having an ASM-mode liquid crystal cell. The ASM-mode liquid crystal cell is characterized in that thickness of the cell is kept by position-adjustable resin spacers. Other features are similar to those of the TN-mode liquid crystal cell. The ASM-mode liquid crystal cell and the ASM-mode liquid crystal display device may be produced according to the description of a published paper by Kume et al. (SID 98 Digest (1998), p. 1089).

[Other Applications]

<Hard-Coat Film, Anti-Glare Film, Anti-Reflection Film>

The film of the present invention may be used in hard-coat films, anti-glare films, and anti-reflection films. For the purpose of improving recognizability of flat panel displays such as LCD, PDP, CRT and EL, the film of the present invention may be provided, on one surface or on both surfaces thereof, with any one of or all of hard-coat layer, anti-glare layer and anti-reflection layer. Preferable embodiments of the film as the anti-glare film and the anti-reflection film are described in detail in JIII Journal of Technical Disclosure (No. 2001-1745, p. 54-57, published on Mar. 15, 2001, by Japan Institute of Invention and Innovation).

<Support for Photographic Film>

The film of the present invention may be used till also as a support of a photosensitive material for silver halide photograph. More specifically, the film of the present invention may preferably be applicable, according to the description relevant to a color negative photographic film in JPA No. 2000-105445. Application as a support for a color reversal photosensitive material for silver halide photograph may be preferable, wherein such a support may be produced using various materials and according to the method of treatment described in JPA No. H11-282119.

<Transparent Substrate>

The film of the present invention may be used still also as transparent substrates aimed at encapsulating a liquid crystal in between, as substitutes for glass substrates of the liquid crystal cell of liquid crystal display devices, because the film has an optical anisotropy of almost zero, and therefore may have an excellent transparency.

Since the transparent substrates aimed at encapsulating a liquid crystal in between are necessarily excellent in gas barrier performance, a gas barrier layer may be provided to the surface of the film of the present invention if necessary. Forms and materials of the gas barrier layer are not specifically limited, wherein possible methods may be such as depositing in vacuo $SiO_2$ or the like at least on one surface of the film of the present invention, and such as providing a coated layer of a polymer relatively higher in the gas barrier performance, such as vinylidene chloride-base polymer, vinyl alcohol-base polymer and so forth. These methods may be appropriately used.

In the embodiments wherein the films of the present invention are used as the transparent substrates aimed at encapsulating a liquid crystal in between, the films may be provided with transparent electrodes through which voltage is applied to drive the liquid crystal. The transparent electrodes are not specifically limited, and may be provided by stacking a metal film, a metal oxide film and so forth, at least on one surface of the film of the present invention. Among them, the metal oxide film is preferable in terms of transparency, electro-conductivity, and mechanical characteristics, and in particular indium oxide mainly composed of tin oxide and containing 2 to 15% by mass of zinc oxide may be used. Methods described in JPA Nos. 2001-125079 and 2000-227603 are adoptable to carry out these techniques.

EXAMPLES

Paragraphs below will further specifically explain the present invention referring to Examples and Comparative Examples, without limiting the present invention. The lubricant compositions in Examples and Comparative Examples were evaluated according to the methods described below.

Example 1

[Production of Cellulose Acetate Film]

The individual ingredients of a composition of a cellulose acetate solution shown below were placed into a mixing tank, and the mixture was stirred under heating to dissolve the individual ingredients, to thereby prepare a cellulose acetate solution.

| Formulation of Cellulose Acetate Solution: | |
|---|---|
| Cellulose acetate with a degree of acetylation of 60.9% | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 318 parts by mass |
| Methanol (second solvent) | 47 parts by mass |

In another mixing tank, polymer (1), polymer (2) or comparative compound (1), 87 parts by mass of methylene chloride and 13 parts by mass of methanol were placed, and the mixture was stirred under heating, to thereby prepare a solution of retardation controlling agent respectively.

Dopes were then prepared by mixing, and then thoroughly stirring, 474 parts by mass of a cellulose acetate solution and 36 parts by mass of each of thus-prepared solution of retardation controlling agent. The individual solutions of retardation controlling agent were prepared by adding the individual amounts, listed in Table 1, of the polymer (1), polymer (2) or comparative compound (1) with respect to 100 parts by mass of cellulose acetate.

Each of thus-obtained dopes was cast on a band using a band casting machine. The film with a residual solvent content of 15% by mass was transversely stretched at 150° C. by free-edge uniaxial stretching, with a stretching ratio of 15%, to thereby produce each cellulose acetate film (92 μm thick).

Re value of each of thus-produced cellulose acetate films was measured at 450 nm, 550 nm and 630 nm using a birefringence analyzer, KOBRA 21ADH (trade name, from Oji Scientific Instruments), by allowing incidence of light of each wavelength in the direction of the normal line. Results are shown in Table 1. Sample No. 1 in Table 1 corresponds to a cellulose acetate film similarly produced, except that solution of retardation controlling agent was not added.

TABLE 1

| No. | Additive | Amount of addition (parts by mass) | Re (450) (nm) | Re (550) (nm) | Re (630) (nm) | Δn (450)/ Δn (550) | Δn (630)/ Δn (550) | Remarks |
|---|---|---|---|---|---|---|---|---|
| 1 | None | 0 | 0.8 | 7.7 | 11.7 | 0.10 | 1.52 | Comparative example |
| 2 | Polymer (1) | 2 | 49.2 | 55.6 | 60.0 | 0.88 | 1.08 | Present invention |
| 3 | Polymer (1) | 3.5 | 58.5 | 65.0 | 68.9 | 0.90 | 1.06 | Present invention |
| 4 | Polymer (2) | 2 | 50.0 | 55.2 | 59.1 | 0.91 | 1.07 | Present invention |
| 5 | Polymer (2) | 3.5 | 59.7 | 65.2 | 69.1 | 0.92 | 1.06 | Present invention |
| 6 | Comparative compound (1) | 3.5 | 63.8 | 63.4 | 64.9 | 1.01 | 1.02 | Comparative example |

TABLE 1-continued

| No. | Additive | Amount of addition (parts by mass) | Re (450) (nm) | Re (550) (nm) | Re (630) (nm) | Δn (450)/ Δn (550) | Δn (630)/ Δn (550) | Remarks |
|---|---|---|---|---|---|---|---|---|

Polymer (1): a homopolymer of the repeating unit shown below (degree of polymerization ≈40)

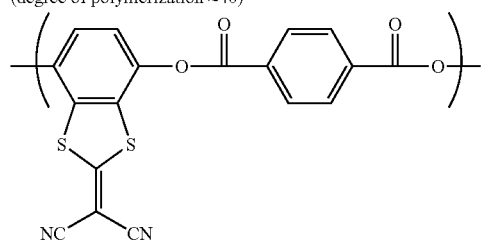

Polymer (2): a homopolymer of the repeating unit shown below (degree of polymerization ≈30)

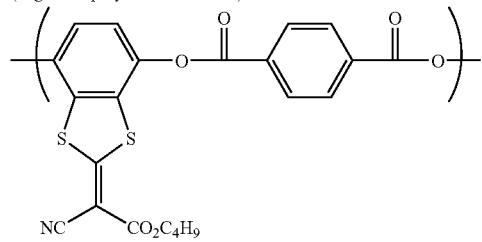

Comparative compound (1)

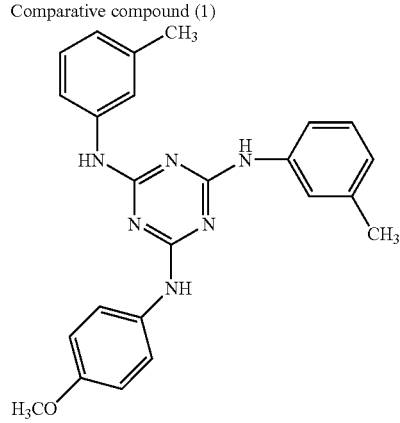

From the results shown in Table 1, it is understandable that the film sample No. 1 without any polymer having the repeating unit represented by formula (I) showed extremely low Re value, and that stretching treatment couldn't contribute to developing Re. It is also understandable that Film sample No. 1 did not satisfy the relational expressions (1) and (2), and was therefore poor in wavelength dispersion characteristics of birefringence Δn.

It is also understandable that the film sample No. 6 produced by adding Comparative Compound (1) showed large Re values at the individual wavelengths, but did not satisfy the above-described relational expressions (1) and (2), and was therefore poor in wavelength dispersion characteristics of birefringence Δn.

In contrast, it is understandable that all samples of the present invention (Sample Nos. 2 to 5) showed large Re values at the individual wavelengths, satisfied the above-described relational expressions (1) and (2), and thereby showed reversed wavelength dispersion characteristics of birefringence Δn.

It is also understandable, from comparison between the sample No. 6 added with Comparative Compound (1) and Sample Nos. 3 and 5 added with the same parts by mass of Polymer (1) or Polymer (2) of the present invention, that there was not so large difference in the Re(550) value, and that Sample Nos. 3 and 5 satisfied the above-described relational expressions (1) and (2), while Sample No. 6 did not.

It is also understandable, from comparison between the sample Nos. 2 and 3 and between Sample Nos. 4 and 5, varied from each other in the amount of addition of Polymer (1) or Polymer (2), Re(550) increased as the amount of addition increased.

Example 2

[Production of Polarizing Plate]

A polarizing film was produced by allowing a polyvinyl alcohol film to adsorb iodine.

Cellulose acetate film sample No. 4 produced in Example 1 in the above was bonded to one side of the polarizing film, using a polyvinyl alcohol-base adhesive. The film herein was saponified under the conditions below.

A 1.5 mol/l aqueous sodium hydroxide solution was prepared, and kept at 55° C. A 0.01 mol/l dilute aqueous sulfuric acid solution was prepared, and kept at 35° C. The cellulose acetate film was immersed in the aqueous sodium hydroxide solution for 2 minutes, and then immersed in water to thoroughly wash off the aqueous sodium hydroxide solution. Next, the film was immersed in the dilute aqueous sulfuric acid solution for 1 minute, and then immersed in water to thoroughly wash off the dilute sulfuric acid solution. Finally, the sample was thoroughly dried at 120° C.

A commercially available cellulose triacylate film (FUJI-TAC TD80UF, trade name, from FUJIFILM Corporation) was saponified, then bonded to the opposite side of the polarizing film using a polyvinyl alcohol-base adhesive, and the product was dried at 70° C. for 10 minutes or longer.

The cellulose acetate film was bonded to the polarizing film so that the slow axis thereof was parallel to the transmission axis of the polarizing film. The commercially available cellulose triacylate film was bonded to the polarizing film so that the slow axis thereof was perpendicular to the transmission axis of the polarizing film.

(Production of Liquid Crystal Cell)

A liquid crystal cell was produced by forming a liquid crystal layer between the substrates held while keeping a 3.6-μm gap in between, into which a liquid crystal material having a negative dielectric anisotropy ("MLC6608", trade name, from MERCK) is dropped and encapsulated. Retardation of the liquid crystal layer (product $\Delta n \cdot d$ of thickness d (μm) of the liquid crystal layer and anisotropy of refractive index $\Delta n$) was adjusted to 300 nm. The liquid crystal material was vertically aligned.

(Mounting to VA-Mode Panel)

A commercially-available, super-high-contrast-type product (HLC2-5618, tradename, from SANRITZ Corporation) was used as an upper polarizing plate (on the observer's side) of a liquid crystal display device employing the above-described VA-mode liquid crystal cell. As a lower polarizing plate (on the backlight side), the polarizing plate provided with Cellulose acetate film Sample No. 4 produced in Example 1 in the above was disposed, so that the cellulose acetate film was disposed at the liquid crystal cell. The upper polarizing plate and the lower polarizing plate were bonded to the liquid crystal cell using a pressure-sensitive adhesive. The upper polarizing plate and the lower polarizing plate were provided in the crossed-nicols arrangement, in which the transmission axis of the former was along the vertical direction of the displaying plane; and the transmission axis of the latter was along the horizontal direction of the displaying plane.

The liquid crystal cell was then applied with a 55-Hz square wave voltage so as to be operated in the normally-black mode, showing the white state at 5 V, and the black state at 0 V. The black state was observed in the viewing-angle direction with an azimuth angle of 45° and a polar angle of 60°; and color sift was evaluated between the viewing-angle directions with an azimuth angle of 45° and a polar angle of 60° and with an azimuth angle of 180° and a polar angle of 60°. And then it was found that the produced liquid crystal display device, comprising the polarizing plate provided with Cellulose acetate film Sample No. 4 of the present invention, successfully achieved a neutral black state, both in the normal line direction and in oblique directions inclined by certain angles with respect to the displaying plane.

What is claimed is:

1. A composition comprising a polymer comprising a repeating unit represented by formula (I) below:

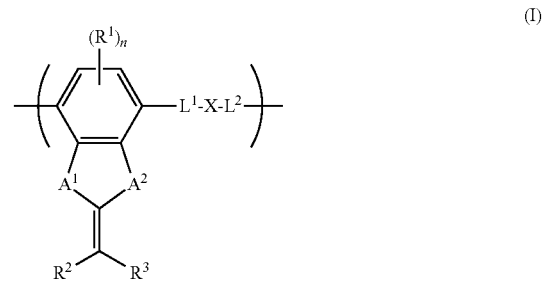

where, each of $A^1$ and $A^2$ independently represents a group selected from the group consisting of —O—, —NR$^a$— wherein R$^a$ represents a hydrogen atom or a substituent, —S—, and —CO—; R$^1$ represents a substituent; R$^2$ and R$^3$ independently represent an electron attractive monovalent substituent having a Hammett's substituent constant $\sigma_p$ of larger than 0, or a heterocyclic group; n is an integer from 0 to 2; X represents an alkenylene group, alkynylene group, arylene group, or heterocyclic group; each of L$^1$ and L$^2$ independently represents one selected from Linking Group II shown below:

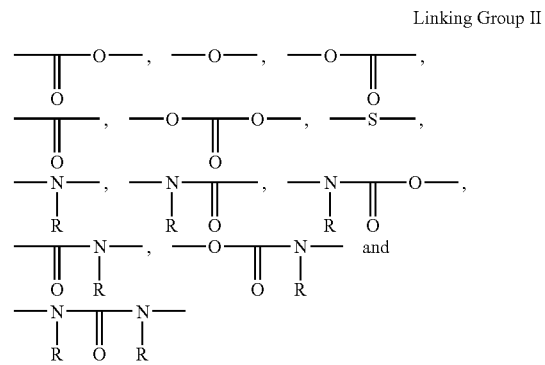

where, R represents a hydrogen atom, alkyl group having 1 to 30 carbon atoms, or cycloalkyl group having 3 to 30 carbon atoms.

2. The composition of claim 1, further comprising a cellulose compound.

3. The composition of claim 2, wherein said cellulose compound is cellulose acylate.

4. A film comprising a polymer comprising a repeating unit represented by formula (I) below:

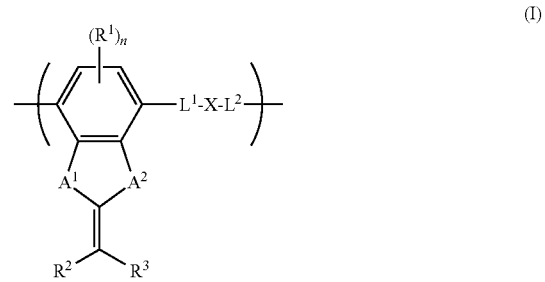

where, each of $A^1$ and $A^2$ independently represents a group selected from the group consisting of —O—, —NR$^a$— wherein R$^a$ represents a hydrogen atom or a substituent, —S—, and —CO—; $R^1$ represents a substituent; $R^2$ and $R^3$ independently represent an electron attractive monovalent substituent having a Hammett's substituent constant $\sigma_p$ of larger than 0, or a heterocyclic group; n is an integer from 0 to 2; X represents an alkenylene group, alkynylene group, arylene group, or heterocyclic group; each of $L^1$ and $L^2$ independently represents one selected from Linking Group II shown below:

Linking Group II

[structures of linking groups]

where R represents a hydrogen atom, alkyl group having 1 to 30 carbon atoms, or cycloalkyl group having 3 to 30 carbon atoms.

5. The film of claim 4, comprising a cellulose compound as a major ingredient.

6. The film of claim 4, having a positive birefringence $\Delta n(550\ nm)$, and satisfying relational expressions (1) and (2) below:

$$0.5 < \Delta n(450\ nm)/\Delta n(550\ nm) < 1.0 \quad (1)$$

$$1.05 < \Delta n(630\ nm)/\Delta n(550\ nm) < 1.5. \quad (2)$$

7. A polarizing plate comprising a polarizer, and the film of claim 4.

8. A liquid crystal display device comprising the film of claim 4.

9. A liquid crystal display device comprising the polarizing plate of claim 7.

10. The composition of claim 1, wherein $R^2$ and $R^3$ independently represent an electron attractive monovalent substituent having a Hammett's substituent constant $\sigma_p$ of larger than 0.

11. The composition of claim 1, wherein $R^2$ and/or $R^3$ represents CN.

12. The composition of claim 2, wherein the amount of the cellulose compound is equal to or more than 50% by mass with respect to the total mass of the composition.

13. The composition of claim 2, wherein the amount of the cellulose compound is equal to or more than 75% by mass with respect to the total mass of the composition.

14. The composition of claim 1, wherein the degree of polymerization of the polymer falls within the range from 100 to 4000 mer.

15. The composition of claim 2, wherein the degree of polymerization of the polymer falls within the range from 100 to 4000 mer.

16. The film of claim 4, wherein the degree of polymerization of the polymer falls within the range from 100 to 4000 mer.

17. The film of claim 5, wherein the amount of the cellulose compound is equal to or more than 50% by mass with respect to the total mass of the film.

18. The composition of claim 1, wherein the repeating unit represented by formula (I) is one or more selected from the group consisting of (1) to (12) below:

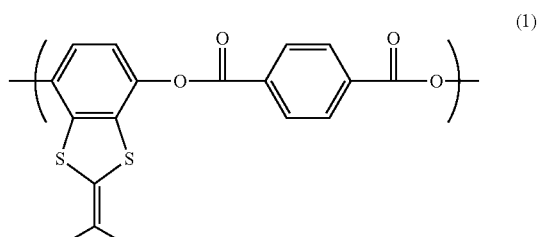

(1)

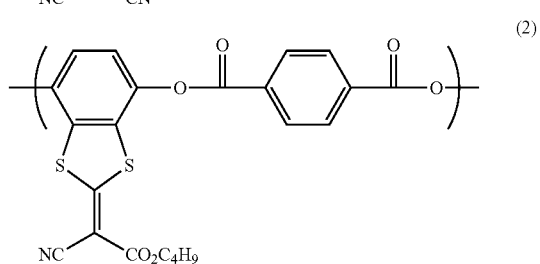

(2)

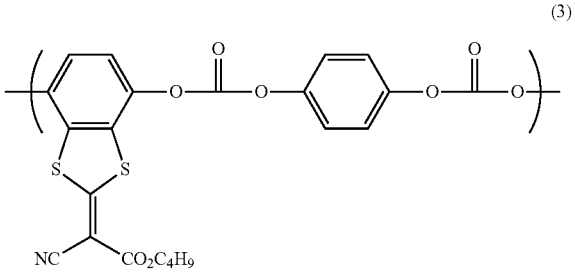

(3)

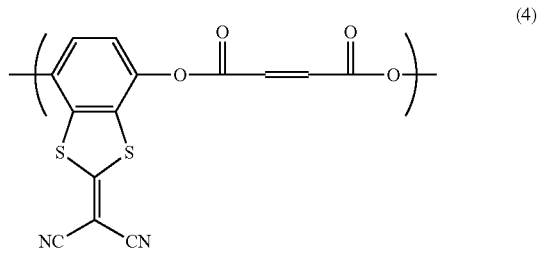

(4)

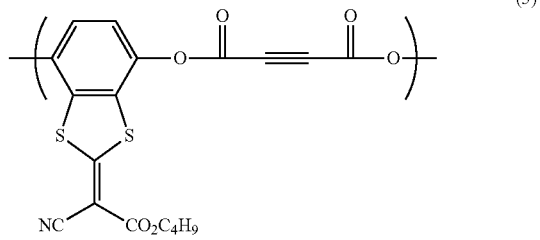

(5)

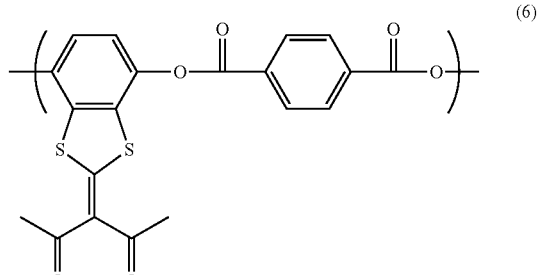

(6)

(7)
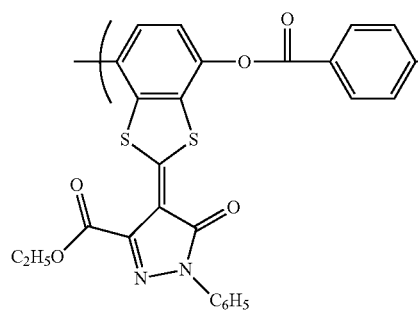
(8)
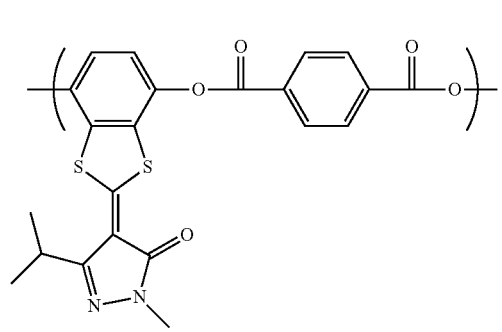
(9)
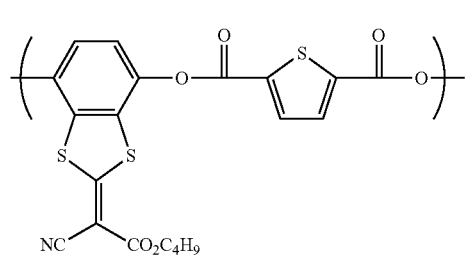
(10)
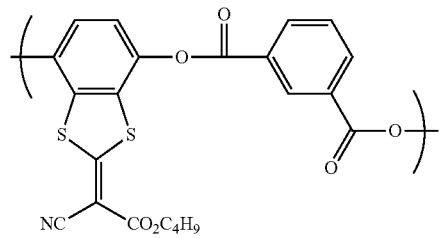
(11)
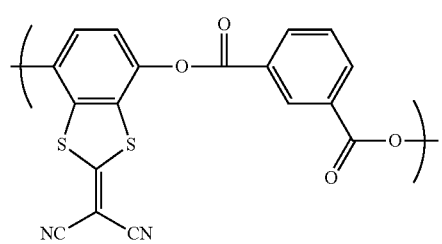
(12)
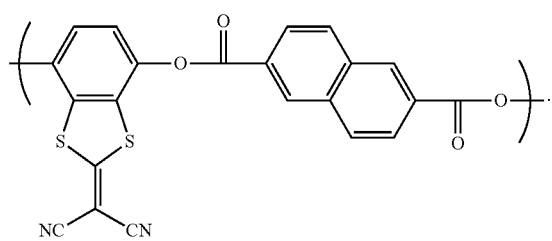
19. The composition of claim 2, wherein the repeating unit represented by formula (I) is one or more selected from the group consisting of (1) to (12) below:
(1)
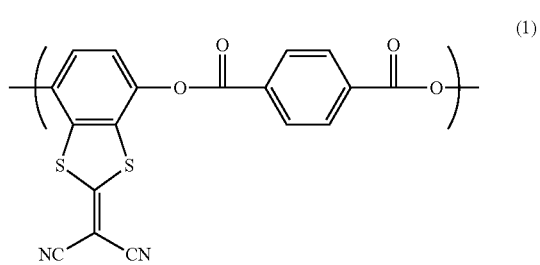
(2)
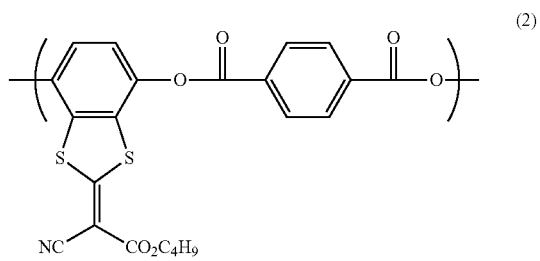
(3)
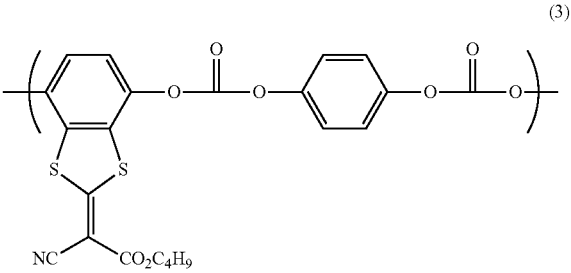
(4)
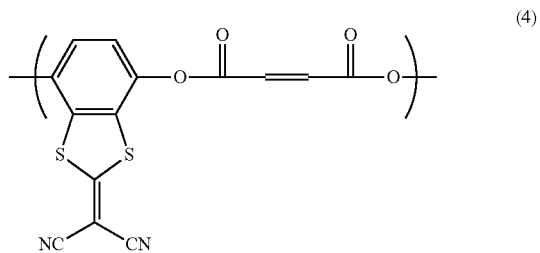

(5) 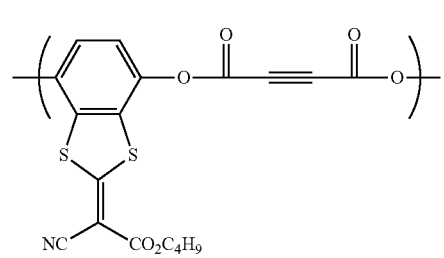
(6) 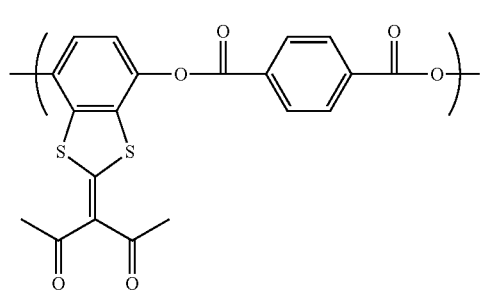
(7) 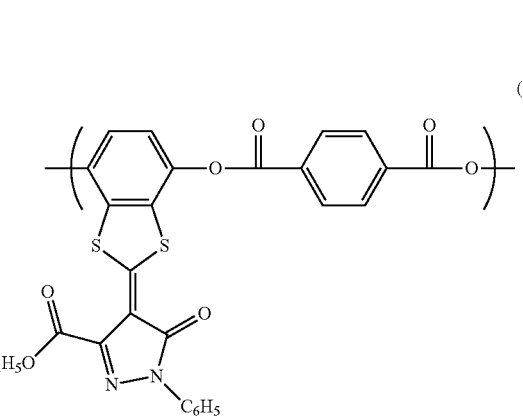
(8) 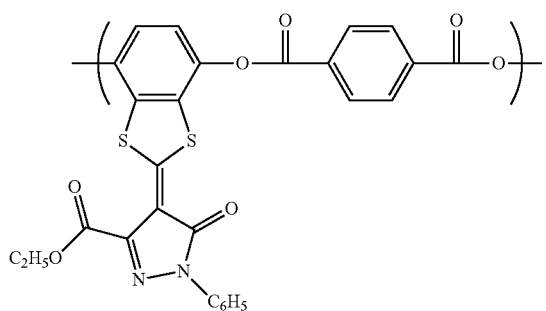
(9) 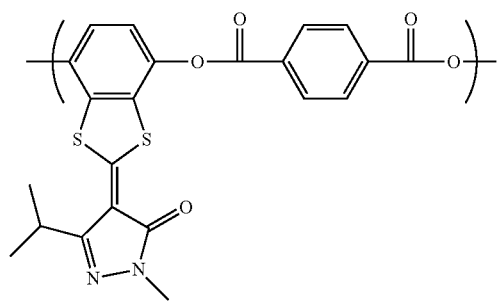
(10) 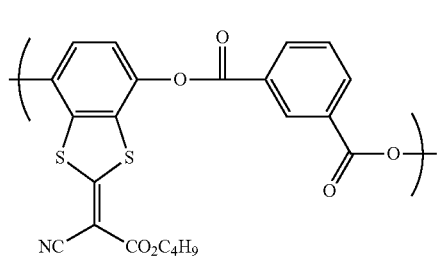
(11) 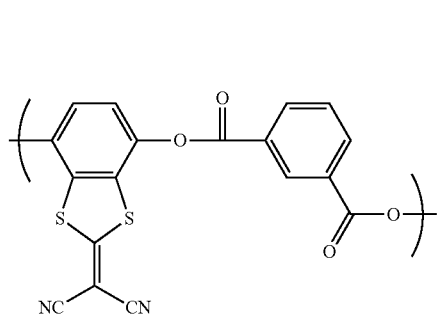
(12) 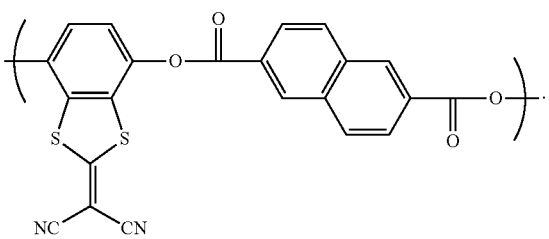
20. The film of claim 4, wherein the repeating unit represented by formula (I) is one or more selected from the group consisting of (1) to (12) below:
(1) 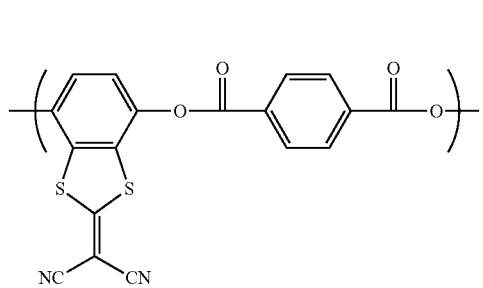
(2) 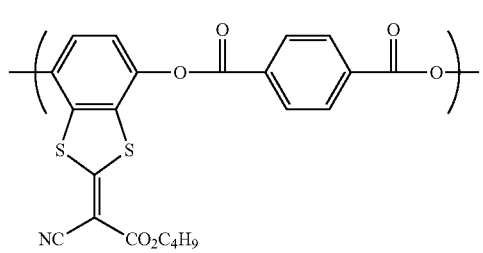

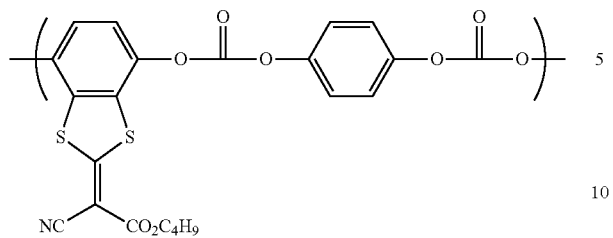
(3)
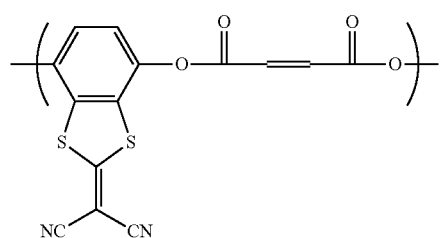
(4)
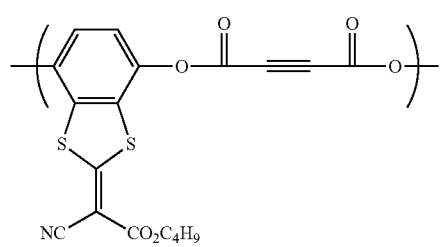
(5)
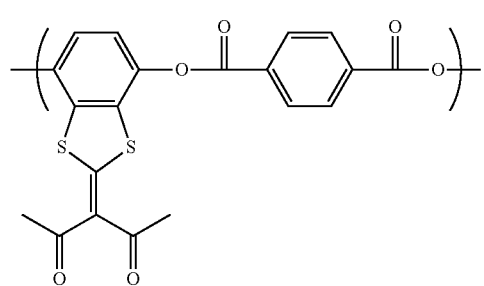
(6)
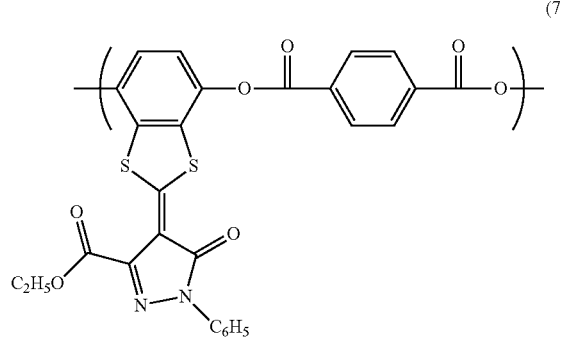
(7)
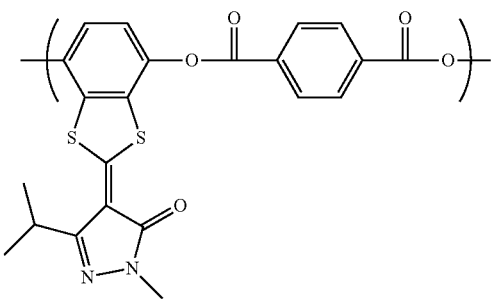
(8)
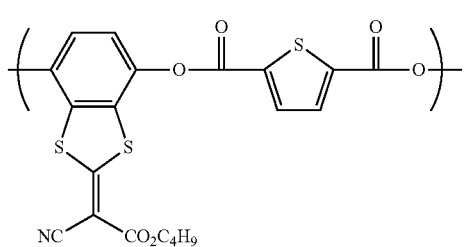
(9)
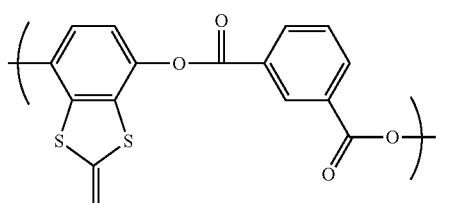
(10)
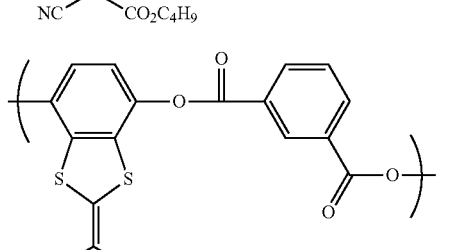
(11)
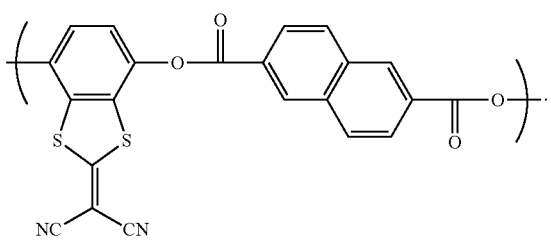
(12)
\* \* \* \* \*